(12) United States Patent
Uhr et al.

(10) Patent No.: US 10,885,501 B2
(45) Date of Patent: Jan. 5, 2021

(54) ACCREDITED CERTIFICATE ISSUANCE SYSTEM BASED ON BLOCK CHAIN AND ACCREDITED CERTIFICATE ISSUANCE METHOD BASED ON BLOCK CHAIN USING SAME, AND ACCREDITED CERTIFICATE AUTHENTICATION SYSTEM BASED ON BLOCK CHAIN AND ACCREDITED CERTIFICATE AUTHENTICATION METHOD BASED ON BLOCK CHAIN USING SAME

(71) Applicant: Coinplug, Inc., Gyeonggi-do (KR)

(72) Inventors: Joon Sun Uhr, Gyeonggi-do (KR); Jay Wu Hong, Seoul (KR); Joo Han Song, Gyeonggi-do (KR)

(73) Assignee: Coinplug, Inc., Gyeonggi-do (KR)

( * ) Notice: Subject to any disclaimer, the term of this patent is extended or adjusted under 35 U.S.C. 154(b) by 38 days.

(21) Appl. No.: 15/768,576

(22) PCT Filed: Jul. 7, 2016

(86) PCT No.: PCT/KR2016/007342
§ 371 (c)(1),
(2) Date: Apr. 16, 2018

(87) PCT Pub. No.: WO2017/065389
PCT Pub. Date: Apr. 20, 2017

(65) Prior Publication Data
US 2019/0005470 A1    Jan. 3, 2019

(30) Foreign Application Priority Data

Oct. 16, 2015 (KR) .................. 10-2015-0144803

(51) Int. Cl.
*G06Q 20/06* (2012.01)
*G06Q 20/02* (2012.01)
(Continued)

(52) U.S. Cl.
CPC ....... *G06Q 20/065* (2013.01); *G06F 16/2379* (2019.01); *G06Q 20/02* (2013.01);
(Continued)

(58) Field of Classification Search
CPC .... G06Q 20/065; G06Q 20/401; G06Q 20/02; H04L 9/0637; H04L 9/3265;
(Continued)

(56) References Cited

U.S. PATENT DOCUMENTS 6,990,583 B2 * 1/2006 Matsuyama .......... H04L 9/3268
                                                              713/175
2015/0332256 A1 * 11/2015 Minor .................. G06Q 20/381
                                                              705/69

FOREIGN PATENT DOCUMENTS

KR    100870202 B1 * 12/2008
KR    100870202 B1   12/2008
(Continued)

OTHER PUBLICATIONS

Bitcoin Technology is also used for certificate issuance, Sep. 19, 2014, www.bloter.net/archives/207040.
(Continued)

*Primary Examiner* — Mohammad A. Nilforoush
*Assistant Examiner* — Dennis G Keritsis
(74) *Attorney, Agent, or Firm* — Husch Blackwell LLP

(57) ABSTRACT

The present invention relates to an accredited certificate issuance system based on a block chain and a method using the same, and an accredited certificate authentication system based on a block chain and a method using the same, which disenable a leak of a personal key by autonomously generating, storing and managing the personal key by a random number generator mounted in a terminal in which it is impossible to install a function or an additional program for physically accessing; enable a public key for accredited
(Continued)

certification to be stored in a block chain of electronic wallets mounted in block chain retention servers via a P2P network-based distribution database, not in a server of an accredited certificate authority (CA), and thus incur almost no costs for maintenance and for operating the established accredited certificate issuance system; and can perform an accredited certification process without ActiveX.

4 Claims, 16 Drawing Sheets

(51) Int. Cl.
*H04L 9/32* (2006.01)
*H04L 9/30* (2006.01)
*G06F 16/23* (2019.01)
*G06Q 20/40* (2012.01)
*H04L 9/06* (2006.01)
*H04L 9/08* (2006.01)

(52) U.S. Cl.
CPC ......... *G06Q 20/401* (2013.01); *H04L 9/0637* (2013.01); *H04L 9/0869* (2013.01); *H04L 9/0894* (2013.01); *H04L 9/30* (2013.01); *H04L 9/3239* (2013.01); *H04L 9/3242* (2013.01); *H04L 9/3265* (2013.01); *H04L 9/3268* (2013.01); *H04L 2209/38* (2013.01); *H04L 2209/56* (2013.01)

(58) Field of Classification Search
CPC ... H04L 9/3242; H04L 9/0869; H04L 9/0894; H04L 9/30; H04L 9/06; H04L 9/32; H04L 2209/56; H04L 2209/38; G06F 16/2379
See application file for complete search history.

(56) References Cited

FOREIGN PATENT DOCUMENTS

| KR | 1020110029032 A | 3/2011 | |
|---|---|---|---|
| KR | 1020130019498 A | 2/2013 | |
| KR | 1020140137098 A | 12/2014 | |
| KR | 101661930 B1 * | 10/2016 | ............. G06Q 40/02 |
| WO | 2017022917 A1 | 2/2017 | |
| WO | WO-2017022917 A1 * | 2/2017 | ......... G06Q 20/3821 |

OTHER PUBLICATIONS

Wilson, Duane, and Giuseppe Ateniese. "From pretty good to great: Enhancing PGP using bitcoin and the blockchain." International conference on network and system security. Springer, Cham, 2015.

* cited by examiner

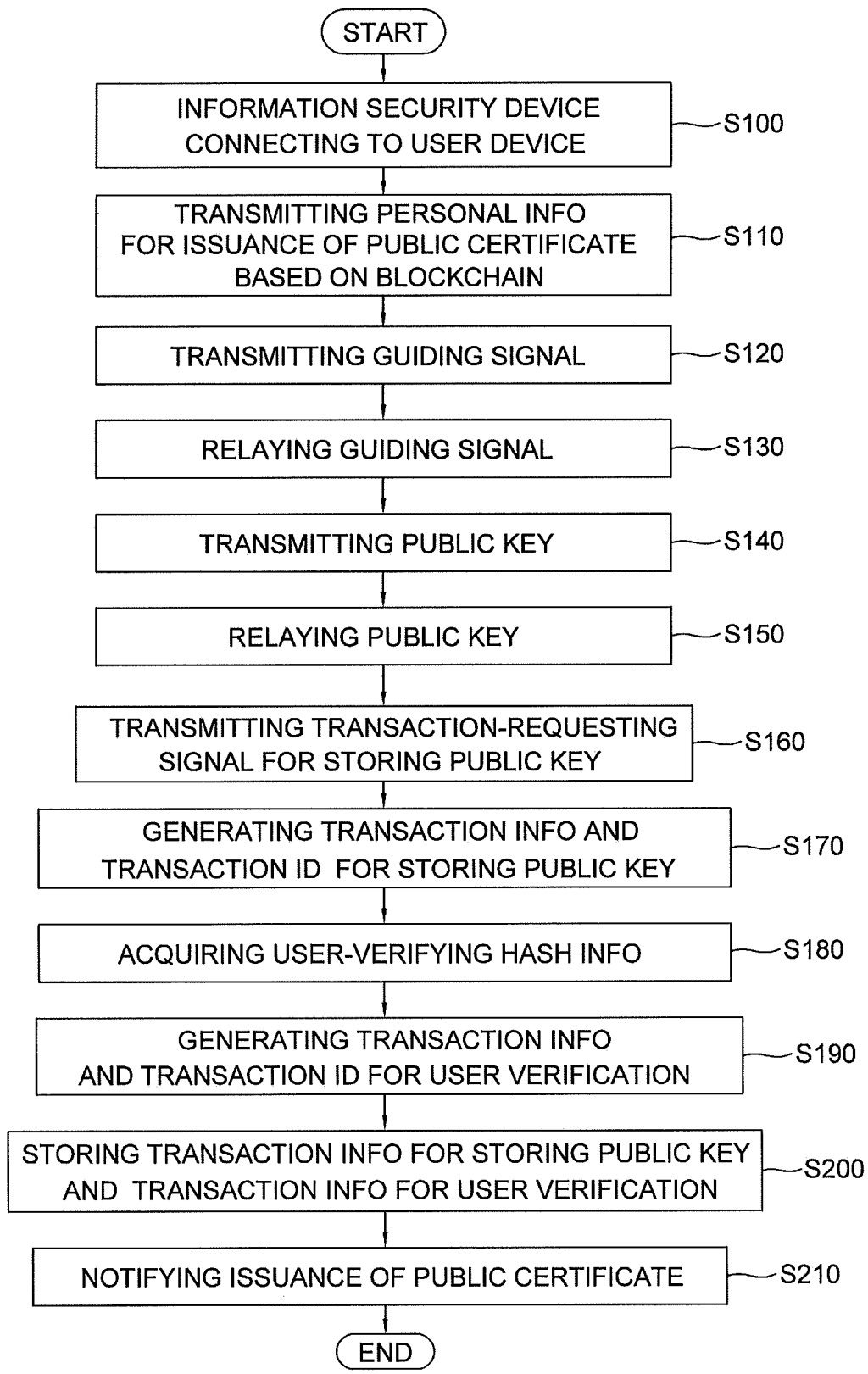

ACCREDITED CERTIFICATE ISSUANCE SYSTEM BASED ON BLOCK CHAIN AND ACCREDITED CERTIFICATE ISSUANCE METHOD BASED ON BLOCK CHAIN USING SAME, AND ACCREDITED CERTIFICATE AUTHENTICATION SYSTEM BASED ON BLOCK CHAIN AND ACCREDITED CERTIFICATE AUTHENTICATION METHOD BASED ON BLOCK CHAIN USING SAME

CROSS REFERENCE TO RELATED APPLICATIONS

This application is a U.S. National Phase Application of International Application No. PCT/KR2016/007342 filed on Jul. 7, 2016, which claims the benefit of priority from Korean Patent Application 10-2015-0144803 filed Oct. 16, 2015. The disclosures of International Application No. PCT/KR2016/007342 and Korean Patent Application 10-2015-0144803 are incorporated herein by reference.

FIELD OF THE INVENTION

The present invention relates to a method of issuing a public certificate based on a blockchain and a system using the same, and a method of authenticating the public certificate based on the blockchain and the system using the same; and more particularly, to the method of performing the authentication of the public certificate even without the ActiveX controls by generating and storing the private key for the public certificate within the random number generator in a device whose internals cannot be accessed physically and on which programs cannot be further installed, thus preventing the leakage of the private key, and by storing and managing the public key, which requires maintenance, in the blockchain of the digital wallet in the blockchain nodes, using a distributed database based on peer-to-peer network, i.e., P2P, not a server managed by a certificate authority, i.e., CA, thus minimizing an additional cost which is required for maintenance of the public certificate issuance system with the high security against hacking.

BACKGROUND OF THE INVENTION

In general, a public certificate is electronic information issued by a certificate authority (CA) for the purpose of confirming an identity of a user, and preventing transaction denials or forgery and falsification of a document upon the use of services in the various industrial fields, representing a kind of certificate of seal impression for a digital transaction. Such a certificate contains a version, a serial number, an effective period, an issuing institution of the certificate, information on verification of an e-signature of a user, a user's name, information on identification confirmation, an e-signature method, etc.

The certificate is used (Cited Patent Literature 1) in a public key infrastructure (PKI) as a standard security method.

The public key infrastructure (PKI) is a set of roles, policies, and procedures needed to create, manage, distribute, use, store, and revoke certificates and manage public key encryption.

However, in the PKI, the private key used for decryption is generated and provided by the CA who is just a third party, not the user, therefore it is open to hacking, and as the user's private key exists in a form of a file at a storing location standardized by a soft token-based storing method, it is easy to copy and automatically collect the private key file and this has a risk of financial damages and user information theft caused by a leaked private key. Therefore, the CA who provides the generated private key to the user must have a certificate issuing system with a high security to minimize hacking attempts, which requires operation and maintenance and thus causes a high cost of the issuance.

In addition, the public certificate can be used only when ActiveX controls are installed in advance for the purpose of additional security for the user authentication process through a web browser. However, to install the ActiveX controls on a personal computer (PC), a security level of the PC must be lowered for the ActiveX controls to access resources including files, registry, etc. Due to the lowered security level of the user's PC caused by the Active X controls, the PC becomes vulnerable to the dangerous environment such as hacking.

Each of the problems associated with the public certificate is resolved by the public certificate issuance system based on the blockchain (refer to Patent Document 2), and a method using the same, and by the public certificate authenticating system based on the blockchain and a method using the same, from the applicant.

The conventional public certificate issuance system based on the blockchain and the method using the same, and the conventional public certificate authentication system based on the blockchain and the method using the same disclose a method for directly generating a public key and a private key for the public certificate within a user device operated by a user, the user device generating the public and private keys while the network is disconnected, preventing possible leakage of the keys by storing and managing the private key encrypted together with a photo image and a password selected by the user, where the public key, which requires maintenance, is stored and managed in the blockchain of the digital wallet in the blockchain server by using a distributed database based on peer-to-peer network (P2P), not a server managed by the CA thus an additional cost is minimized which is required for maintenance of the public certificate issuance system with the high security against hacking, and performing authentication even without the ActiveX controls.

However, in spite of this advantage, in the conventional public certificate issuance system based on the blockchain and the method using the same, and the conventional public certificate authentication system based on the blockchain and the method using the same, as the user device generates the public and private keys while the network is disconnected, the generated the private key is encrypted together with a photo image and a password selected by the user, it is safer than the case of storing plain text, however, the private key is stored in the memory as plain text at the time of inputting the password and selecting the photo image and thus it has a risk of leakage when the user uses the private key if a memory dumper is being executed on the user device.

PRIOR ART

Cited Patent Literature

Cited Patent Literature 1: Korean Patent Publication No. 10-0411448 registered on Dec. 3, 2003
Cited Patent Literature 1: Korean Patent Laid-Open Publication No. 10-2015-0109320 filed on Aug. 3, 2015

SUMMARY OF THE INVENTION

It is an object of the present invention to solve all the aforementioned problems.

It is another object of the present invention to provide a method of issuing a public certificate based on a blockchain and a system using the same, and a method of authenticating the public certificate based on the blockchain and a system using the same, which perform the authentication of the public certificate even without the ActiveX controls by generating and storing the private key for the public certificate within the random number generator in a device whose internals cannot be accessed physically and on which programs cannot be further installed, thus preventing the leakage of the private key, and by storing and managing the public key, which requires maintenance, in the blockchain of the digital wallet in the blockchain nodes, using a distributed database based on peer-to-peer network, i.e., P2P, not a server managed by a certificate authority, i.e., CA, thus minimizing an additional cost which is required for maintenance of the public certificate issuance system with the high security against hacking.

In accordance with one aspect of the present invention, there is provided a system for issuing a public certificate based on a blockchain, including: an information security device instructing its encryption engine to create a public key for the public certificate based on a private key for the public certificate stored and managed in a memory and transmit the created public key in response to a request for transmission of the public key, wherein the private key is acquired based on a random value generated from a random number generator and stored in the memory and then provided to a user; a user device transmitting the public key sent from the information security device and personal information for an issuance of the public certificate based on the blockchain, wherein the personal information includes user identification information required for the issuance; an issuance-requesting server (i) receiving the personal information and the public key from the user device, (ii) hashing the personal information to acquire user-identifying hash information for authentication, and (iii) acquiring the user-identifying hash information for authentication, the public key, and user identification information corresponding to the user among all pieces of user identification information included in all pieces of personal information, to thereby create and transmit a transaction-requesting signal; a certificate-managing server (I) (i) generating (i-1) transaction information for storing the public key and (i-2) a transaction ID for storing the public key to be used as a key value for searching the transaction information for storing the public key, wherein the transaction information includes the public key in the transaction-requesting signal, (ii) transmitting the transaction information for storing the public key, and storing and managing the transaction ID for storing the public key, (II) (i) hashing the user-identifying hash information for authentication in the transaction-requesting signal and the transaction ID for storing the public key to acquire user-verifying hash information for authentication, (ii) generating (ii-1) transaction information for user verification including the user-verifying hash information for authentication and (ii-2) a transaction ID for user verification to be used as a key value for searching the transaction information for user verification, (iii) transmitting the transaction information for user verification, and storing and managing the transaction ID for user verification, and (III) storing and managing the user identification information in the transaction-requesting signal; and blockchain nodes storing the transaction information for user verification and the transaction information for storing the public key transmitted from the certificate-managing server in the blockchain, wherein the blockchain nodes authorize a cryptocurrency payment through verification of transaction information for the cryptocurrency payment if the transaction information for the cryptocurrency payment is received, and store the transaction information for the cryptocurrency payment in the blockchain by referring to a result of the authorizing process.

In accordance with another aspect of the present invention, there is provided a method for issuing a public certificate based on a blockchain, including: a step S100 of an information security device connecting to a user device, wherein the information security device includes its random number generator and its memory where a private key for the public certificate is stored and managed, the private key being generated from the random number generator; a step S110 of the user device transmitting personal information for an issuance of the public certificate based on the blockchain, wherein the personal information includes user identification information required for the issuance, to an issuance-requesting server to thereby request the issuance; a step S120 of the issuance-requesting server recognizing the personal information, and creating and transmitting a guiding signal, which requests sending of a public key for the public certificate, to the user device; a step S130 of the user device relaying the transmitted guiding signal to the information security device; a step S140 of the information security device, if the guiding signal is relayed, instructing its encryption engine to create the public key using the private key stored in the memory, and transmitting the public key to the user device; a step S150 of the user device relaying the public key to the issuance-requesting server; a step S160 of the issuance-requesting server receiving the public key, instructing its hashing engine to hash the personal information to acquire user-identifying hash information for authentication, and acquiring the user-identifying hash information for authentication, the public key, and user identification information corresponding to the user among all pieces of user identification information included in all pieces of personal information, to thereby create and transmit a transaction-requesting signal to a certificate-managing server; a step S170 of the certificate-managing server (i) instructing its transaction-processing engine to store the user identification information, which is included in the transaction-requesting signal, in a keyword DB for searching transaction by user, and (ii) creating (ii-1) transaction information for storing the public key, wherein the transaction information includes the public key, and (ii-2) a transaction ID for storing the public key to be used as a key value for searching the transaction information for storing the public key; a step S180 of the certificate-managing server instructing its hashing engine to hash the transaction ID for storing the public key and the user-identifying hash information in the transaction-requesting signal, to thereby acquire user-verifying hash information for authentication; a step S190 of the certificate-managing server (i) instructing the transaction-processing engine to transmit the transaction information for storing the public key to blockchain nodes, (ii) storing the transaction ID for storing the public key in the keyword DB, (iii) creating (iii-1) transaction information for user verification including the user-verifying hash information for authentication and (iii-2) a transaction ID for user verification to be used as a key value for searching the transaction information for user verification, (iv) transmitting the transaction information for user verification to the blockchain nodes, and (v) storing and managing the transaction ID for user verification in the keyword DB; and a step S200 of the blockchain nodes storing the transaction information for storing the public key and the transaction information for user verification in the blockchain to thereby complete the issuance.

In accordance with still another aspect of the present invention, there is provided a system for authenticating a public certificate based on a blockchain, including: an information security device including its decryption engine and its memory having a private key for the public certificate; a user device requesting an authentication of the public certificate based on the blockchain; an authentication-requesting server, which includes its random number generator and its encryption engine, relaying a request for the authentication by transmitting user identification information on a user who operates the user device, in response to the request for the authentication from the user device; a certificate-managing server which requests a download of transaction information for storing a public key for the public certificate and transaction information for user verification, by transmitting a transaction ID for user verification and a transaction ID for storing the public key corresponding to the user identification information received from the authentication-requesting server; and blockchain nodes (i) authorizing a cryptocurrency payment by verifying transmitted transaction information on the cryptocurrency payment, (ii) storing in the blockchain (ii-1) the transaction information on the cryptocurrency payment, (ii-2) transaction information for storing the public key, wherein the transaction information includes the public key, and (ii-3) transaction information for user verification including the user-verifying hash information for authentication, and (iii) transmitting to the certificate-managing server the transaction information for storing the public key and the transaction information for user verification retrieved from the blockchain by respectively referring to the transaction ID for storing the public key and the transaction ID for user verification received from the certificate-managing server; wherein the certificate-managing server (i) acquires the public key and the user-verifying hash information for authentication respectively from the transaction information for storing the public key and the transaction information for user verification received from the blockchain nodes, and (ii) transmits to the authentication-requesting server a validity-confirming signal of the public certificate, wherein the validity-confirming signal includes the acquired public key, the user-verifying hash information for authentication, and the transaction ID for storing the public key, wherein the authentication-requesting server (I) (i) retrieves the user identification information from an identification information DB, (ii) acquires user-identifying hash information for comparison by hashing the user identification information, (iii) acquires user-verifying hash information for comparison by hashing (iii-1) the transaction ID for storing the public key included in the validity-confirming signal and (iii-2) the user-identifying hash information for comparison, (II) (i) if a hash value of the user-verifying hash information for authentication included in the validity-confirming signal corresponds to a hash value of the user-verifying hash information for comparison, confirms a protocol used for Internet communications by the user device, and (ii) if the protocol is determined as HTTP, instructs its random number generator to generate a random session key, and (III) instructs its encryption engine to acquire an encrypted random session key by encrypting the random session key using the public key included in the validity-confirming signal, and to relay the encrypted random session key to the information security device by way of the user device, and wherein the information security device instructs the decryption engine to acquire the random session key by decrypting the encrypted random session key by using the private key stored in the memory, and to transmit the random session key to the user device, to thereby complete the authentication of the user.

In accordance with still yet another aspect of the present invention, there is provided a method for issuing a public certificate based on a blockchain, including: a step S300 of a user device transmitting an authentication request for the public certificate based on the blockchain by connecting to an authentication-requesting server; a step S310 of the authentication-requesting server acquiring user identification information on a user who operates the user device from an identification information DB, in response to the authentication request, and transmitting the user identification information to a certificate-managing server; a step S320 of the certificate-managing server transmitting to blockchain nodes a transaction ID for storing a public key for the public certificate and a transaction ID for user verification retrieved from a keyword DB by referring to the user identification information, to thereby request a download of transaction information for storing the public key and transaction information for user verification; a step S330 of the blockchain nodes transmitting to the certificate-managing server the transaction information for storing the public key and the transaction information for user verification retrieved therefrom, by referring to the transmitted transaction ID for storing the public key and the transmitted transaction ID for user verification; a step S370 of the certificate-managing server instructing its transaction-processing engine to acquire the public key and user-verifying hash information for authentication respectively from the transaction information for storing the public key and the transaction information for user verification; a step S380 of the certificate-managing server transmitting to the authentication-requesting server a validity-confirming signal of the public certificate, wherein the validity-confirming signal includes (i) the transaction ID for storing the public key, which is stored in the keyword DB, (ii) the public key, and (iii) the user-verifying hash information for authentication; a step S390 of the authentication-requesting server retrieving the user identification information from the identification information DB, instructing its hashing engine to acquire user-identifying hash information for comparison by hashing the user identification information, and acquiring user-verifying hash information for comparison calculated by hashing both the transaction ID for storing the public key included in the validity-confirming signal transmitted from the authentication-requesting server and the user-identifying hash information for comparison; a step S400 of the authentication-requesting server determining whether a hash value of the user-verifying hash information for authentication included in the validity-confirming signal corresponds to a hash value of the user-verifying hash information for comparison after acquiring the hash value of the user-verifying hash information for authentication and the hash value of the user-verifying hash information for comparison from its hashing engine; a step S410 of the authentication-requesting server, if the hash value of the user-verifying hash information for authentication included in the validity-confirming signal corresponds to the hash value of the user-verifying hash information for comparison, confirming whether a protocol used for Internet communications between the user device and the authentication-requesting server is HTTP or HTTPS; a step S420 of the authentication-requesting server, if the protocol is determined as HTTP, instructing its random number generator to acquire a random session key; a step S430 of the authentication-requesting server instructing its encryption engine to encrypt the random session key by using the public key included in the validity-confirming signal, to thereby acquire and transmit an encrypted random session key to the user device; a step S440 of the user device relaying the encrypted random session key to an information security device; and a step S450 of the information security device instructing its decryption engine to decrypt the encrypted random session key by using a private key for the public certificate stored in its memory, to acquire the random session key, and transmitting the random session key to the user device to thereby complete an authentication of the user.

In accordance with still yet another aspect of the present invention, there is provided a system for authenticating a public certificate based on a blockchain, including: an information security device including its decryption engine and its memory having a private key for the public certificate; a user device requesting an authentication of the public certificate based on the blockchain; an authentication-requesting server, which includes its random number generator and its encryption engine, acquiring user identification information on a user from an identification information DB, acquiring user-identifying hash information for comparison by hashing the user identification information, and transmitting the acquired user-identifying hash information for comparison and the user identification information, in response to a request for the authentication from the user device; a certificate-managing server receiving the user-identifying hash information for comparison and the user identification information from the authentication-requesting server, and transmitting a transaction ID for user verification and a transaction ID for storing a public key for the public certificate, which are retrieved from a keyword DB by referring to the user identification information, to thereby request a download of transaction information for storing the public key and transaction information for user verification; and blockchain nodes (i) authorizing a cryptocurrency payment by verifying transmitted transaction information on the cryptocurrency payment, (ii) storing in the blockchain (ii-1) the transaction information on the cryptocurrency payment, (ii-2) the transaction information for storing the public key, which includes the public key, and (ii-3) transaction information for user verification which contains user-verifying hash information, and (iii) transmitting to the certificate-managing server the transaction information for storing the public key and the transaction information for user verification retrieved from the blockchain by respectively referring to the transaction ID for storing the public key and the transaction ID for user verification received from the certificate-managing server; wherein the certificate-managing server acquires the public key and user-verifying hash information for authentication from the transaction information for storing the public key and the transaction information for user verification transmitted from the blockchain nodes, acquires user-verifying hash information for comparison by hashing the transmitted user-identifying hash information for comparison and a transaction ID for storing the public key in the keyword DB, and transmits to the authentication-requesting server the acquired public key and the user identification information if a hash value of the acquired user-verifying hash information for authentication corresponds to a hash value of the user-verifying hash information for comparison, wherein the authentication-requesting server, if the public key and the user identification information are received, confirms a protocol for Internet communications by the user device, and if the protocol is HTTP, instructs its random number generator to generate a random session key, instructs its encryption engine to acquire an encrypted random session key by encrypting the random session key using the public key included in the validity-confirming signal, and relays the encrypted random session key to the information security device by way of the user device, and wherein the information security device instructs its decryption engine to acquire the random session key by decrypting the encrypted random session key using the private key in its memory and transmits the random session key to the user device, to thereby complete the authentication of the user.

In accordance with still yet another aspect of the present invention, there is provided a method for issuing a public certificate based on a blockchain, including: a step S600 of a user device transmitting an authentication request for the public certificate based on the blockchain by connecting to an authentication-requesting server; a step S610 of the authentication-requesting server acquiring user identification information on a user who operates the user device from an identification information DB, in response to the authentication request, instructing its hashing engine to hash the acquired user identification information to acquire user-identifying hash information for comparison, and transmitting the acquired user-identifying hash information for comparison and the user identification information to a certificate-managing server; a step S620 of the certificate-managing server receiving the user identification information, transmitting to blockchain nodes a transaction ID for storing a public key for the public certificate and a transaction ID for user verification retrieved from a keyword DB by referring to the received user identification information, to thereby request a download of transaction information for storing the public key and transaction information for user verification; a step S630 of the blockchain nodes transmitting to the certificate-managing server the transaction information for storing the public key and the transaction information for user verification retrieved therefrom, by referring to the transmitted transaction ID for storing the public key and the transmitted transaction ID for user verification; a step S670 of the certificate-managing server instructing its transaction-processing engine to acquire the public key and user-verifying hash information for authentication respectively from the transaction information for storing the public key and the transaction information for user verification; a step S680 of the certificate-managing server instructing its hashing engine to hash the transmitted user-identifying hash information for comparison and the transaction ID for storing the public key to thereby acquire user-verifying hash information for comparison, wherein the transaction ID for storing the public key is stored in the keyword DB; a step S690 of the hashing engine of the certificate-managing server acquiring a hash value of the acquired user-verifying hash information for authentication and a hash value of the user-verifying hash information for comparison, and confirming whether the hash value of the acquired user-verifying hash information for authentication corresponds to the hash value of the user-verifying hash information for comparison; a step S700 of the certificate-managing server, if the hash value of the acquired user-verifying hash information for authentication corresponds to the hash value of the user-verifying hash information for comparison, transmitting to the authentication-requesting server the acquired public key and the user identification information; a step S710 of the authentication-requesting server, if the public key and the user identification information are received, confirming whether a protocol used for Internet communications between the user device and the authentication-requesting server is HTTP or HTTPS; a step S720 of the authentication-requesting server, if the protocol is determined as HTTP, instructing its random number generator to acquire a random session key; a step S730 of the authentication-requesting server instructing its encryption engine to encrypt the random session key by using the public key included in the validity-confirming signal, to thereby acquire and transmit an encrypted random session key to the user device; a step S740 of the user device relaying the encrypted random session key to an information security device; and a step S750 of the information security device instructing its decryption engine to decrypt the encrypted random session key by using a private key for the public certificate stored in a memory, to acquire the random session key, and transmitting the random session key to the user device to thereby complete authentication of the user.

BRIEF DESCRIPTION OF THE DRAWINGS

The above and other objects and features of the present invention will become apparent from the following description of preferred embodiments given in conjunction with the accompanying drawings, in which:

The following drawings to be used to explain example embodiments of the present invention are only part of example embodiments of the present invention and other drawings can be obtained based on the drawings by those skilled in the art of the present invention without inventive work.

FIG. 6 is a sequence diagram illustrating a process of the issuance of the public certificate by using the system for issuing the public certificate based on the blockchain in accordance with the present invention.

DETAILED DESCRIPTION OF THE PREFERRED EMBODIMENTS

Figure 1:
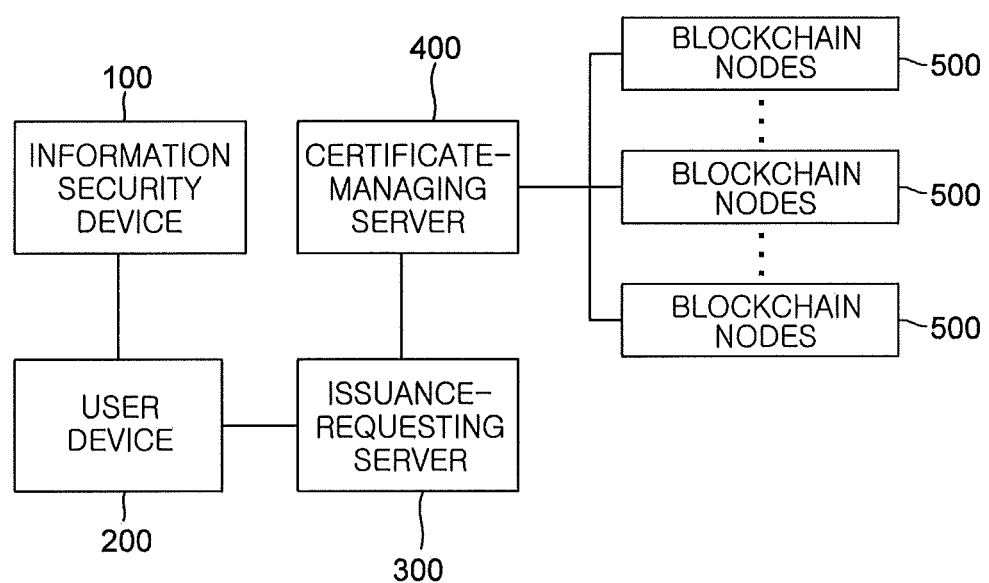
FIG. 1 is a block diagram illustrating a system for issuing a public certificate based on a blockchain in accordance with the present invention.
Figure 2:
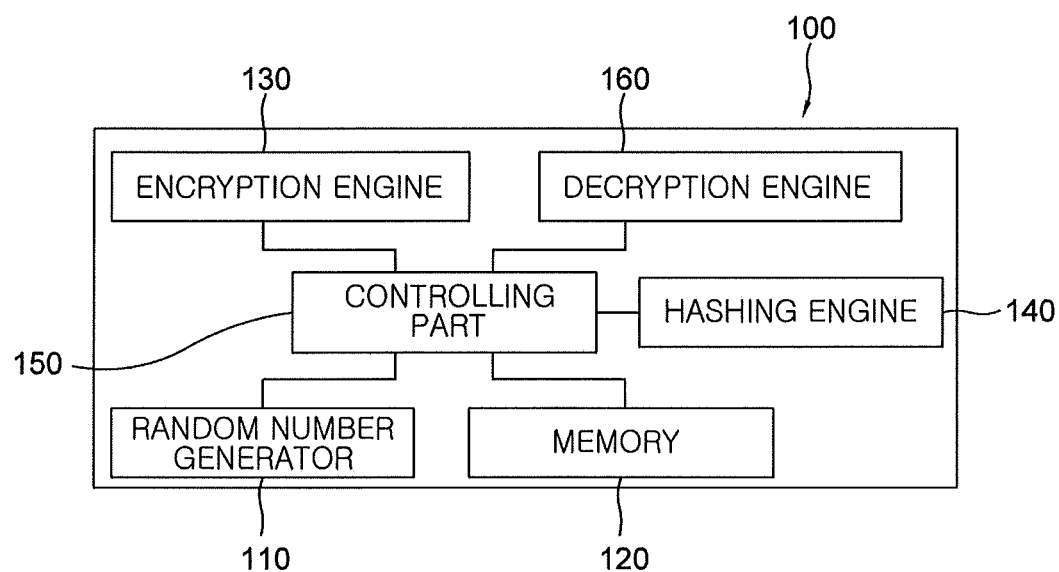
FIG. 2 is a block diagram illustrating a detailed configuration of an information security device of the system for issuing the public certificate based on the blockchain in accordance with the present invention.
Figure 3:
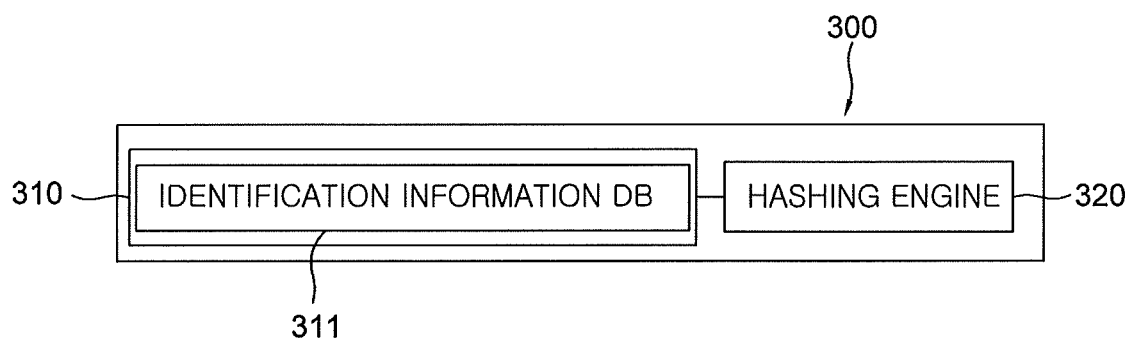
FIG. 3 is a block diagram illustrating a detailed configuration of an issuance-requesting server of the system for issuing the public certificate based on the blockchain in accordance with the present invention.
Figure 4:
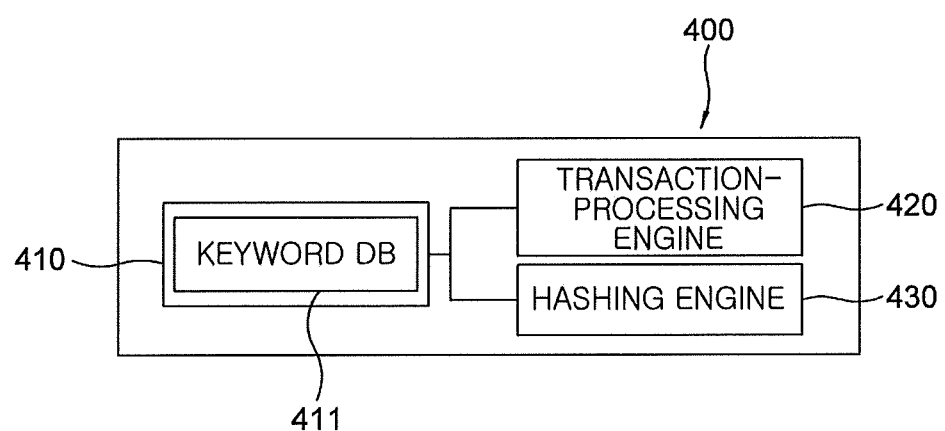
FIG. 4 is a block diagram illustrating a detailed configuration of a certificate-managing server of the system for issuing the public certificate based on the blockchain in accordance with the present invention.

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Unless otherwise noted in this specification or clearly contradicted in the context, an item indicated in the singular includes those in the plural, unless otherwise required in the context. These embodiments will be described in sufficient detail by referring to attached drawings regarding the embodiments of the present invention to enable those skilled in the art to practice the invention.

A term "user identification information" in the present invention may mean specific user identification information, which is user identification information on a specific user.

A term "public key" in the present invention means a public key used for a public certificate, unless otherwise noted.

The present invention includes part for an issuance and part for an authentication of the public certificate based on a blockchain.

Herein, FIGS. 1 to 6 illustrate a method and a system for issuing the public certificate based on the blockchain, which is the part for the issuance.

As illustrated, the system for issuing the public certificate based on the blockchain in accordance with the present invention may include an information security device 100, a user device 200, an issuance-requesting server 300, a certificate-managing server 400, and blockchain nodes 500.

First, the information security device 100 may be a device whose internals cannot be accessed physically and on which any programs cannot further be installed, and because the device generates a private key for the public certificate inside itself by using its random number generator 110, transmits the private key in a memory 120, as is, to a user, and generates the public key in the information security device 100, the device may prevent leakage of the private key.

The detailed configuration of the information security device 100 may include its random number generator 110 and its memory 120 where the private key generated from the random number generator 110 is stored, an encryption engine 130 which generates the public key based on the private key stored in the memory 120 in response to a transmission request for the public key, and a controlling part 150 which controls the random number generator 110, the memory 120, and the encryption engine 130.

As aforementioned, the information security device 100, as such, may be a highly secure device with least hacking risk because the private key is generated and stored as soon as the information security device is manufactured, and provided to the user with the private key in it, where Physical Unclonable Function, i.e., PUF, technology or Tamper Resistance Hardware technology may be used.

The user device 200 may be used by the user who receives the information security device 100, and may transmit the public key sent from the information security device 100 and personal information for the issuance of the public certificate based on the blockchain to the issuance-requesting server, to be described later, where the personal information includes the user identification information required for the issuance.

Herein, the personal information may include a name of the user, a birth date of the user, a phone number of the user, and an e-mail address of the user.

The user device 200 as such may include various devices as personal computers or smart phones, and connection between the user device 200 and the information security device 100 may be performed by using wired or wireless communications like Bluetooth Low Energy, i.e., BLE, Near Field Communication, i.e., NFC, and Universal Serial Bus.

Also, the user device 200 may recognize information on the user by confirming whether the user who operates the user device 200 has registered the user identification information in the issuance-requesting server 300, to be described later, of the public certificate based on the blockchain, before transmission of the personal information to the issuance-requesting server 300.

For this purpose, the issuance-requesting server 300 may include a DB part 310, and the DB part 310 may store the user identification information on the user who operates 200 and may include an identification information DB 311 where the user identification information corresponding to the personal information is stored.

The user device 200 may transmit the personal information to the issuance-requesting server 300 to thereby request the issuance. If information corresponding to the personal information is determined as present in the identification information DB 311, the issuance-requesting server 300 may generate and transmit a transmission-requesting signal for the public key to the user device 200. The user device 200 may transmit the transmission-requesting signal to the information security device 100. If the transmission-requesting signal is received, the information security device 100 may instruct the encryption engine 130 to generate the public key based on the private key stored in the memory 120, and transmit the public key to the user device 200, and the user device 200 may transmit the public key to the issuance-requesting server 300.

By these operations, generation of the private key and the public key is performed within the information security device 100 whose internals cannot be accessed physically and on which programs cannot be further installed, thus the leakage of the private key may be prevented.

The issuance-requesting server 300 may receive the personal information and the public key from the user device 200, hash the personal information to thereby acquire user-identifying hash information for authentication. Then, the issuance-requesting server 300 may acquire the user-identifying hash information for authentication, the public key, and the user identification information corresponding to the user among all pieces of user identification information included in all pieces of personal information, to thereby create and transmit a transaction-requesting signal to a certificate-managing server 400 which manages the public certificate based on the blockchain, to be described later. Herein, the user identification information may utilize the phone number of the user, especially a mobile phone number.

For this purpose, the issuance-requesting server 300 may include its hashing engine 320.

As such, the hashing engine 320 of the issuance-requesting server 300 may hash the personal information to thereby acquire user-identifying hash information for authentication.

The issuance-requesting server 300 with such functions may be operated by a bank.

The certificate-managing server 400 may (I) (i) generate (i-1) transaction information for storing the public key and (i-2) a transaction ID for storing the public key to be used as a key value for searching the transaction information for storing the public key, where the transaction information may include the public key in the transaction-requesting signal from the issuance-requesting server 300, (ii) transmit the transaction information for storing the public key, and store and manage the transaction ID for storing the public key, (II) (i) hash the user-identifying hash information for authentication in the transaction-requesting signal and the transaction ID for storing the public key to acquire user-verifying hash information for authentication, (ii) generate (ii-1) transaction information for user verification including the user-verifying hash information for authentication and (ii-2) a transaction ID for user verification to be used as a key value for searching the transaction information for user verification, (iii) transmit the transaction information for user verification, and store and manage the transaction ID for user verification, and (III) store and manage the user identification information in the transaction-requesting signal.

To perform such functions, the certificate-managing server 400 may include a DB part 410 having a keyword DB 411 for searching transaction by user, a transaction-processing engine 420, and a hashing engine 430.

First, the transaction-processing engine 420 may (i) store the user identification information in the keyword DB 411 for searching transaction by user, and (ii) create (ii-1) transaction information for storing the public key, where the transaction information includes the public key and (ii-2) a transaction ID for storing the public key to be used as a key value for searching the transaction information for storing the public key.

Then, the hashing engine 430 may hash the transaction ID for storing the public key and the user-identifying hash information for authentication in the transaction-requesting signal, to thereby acquire user-verifying hash information for authentication.

Also, the transaction-processing engine 420 may (i) transmit the transaction information for storing the public key to blockchain nodes 500, (ii) store the transaction ID for storing the public key in the keyword DB 411, (iii) create (iii-1) transaction information for user verification including the user-verifying hash information for authentication and (iii-2) a transaction ID for user verification to be used as a key value for searching the transaction information for user verification, (iv) transmit the transaction information for user verification to the blockchain nodes 500, and (v) store and manage the transaction ID for user verification in the keyword DB 411.

The certificate-managing server 400 with such functions may be a server of a company whose service requires the public certificate, like a server of the bank or a securities firm, a server of a government institution, or a server of an on-line Internet shopping mall.

Figure 5A:
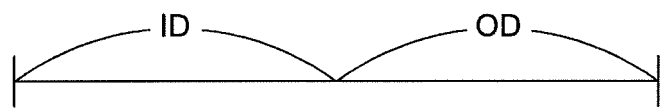
FIGS. 5A to 5D are drawings schematically illustrating data structures of various transaction information including input data and output data.

Meanwhile, the transaction information for cryptocurrency payment stored in the blockchain nodes 500 may include, by referring to FIG. 5A, (i) a transaction ID of previous cryptocurrency payment, to be used for locating cryptocurrency to be spent which is part of cryptocurrency amount owned by a sender, using transaction information for the previous cryptocurrency payment, (ii) permission information on whether the sender is authorized to use the cryptocurrency, (iii) a public key for the cryptocurrency payment required for validating the permission information, (iv) OP_DUP information which represents that the transaction information is not a monetary transaction related to the cryptocurrency payment but a meta-transaction for recording information, and (v) data including amount of cryptocurrency to be sent, and (vi) receiver identification information for identifying a receiver.

Herein, the transaction ID of the previous cryptocurrency payment may be information used as a key value for searching the previous cryptocurrency payment transactions. The permission information on the sender may be electronic signature information of the sender, and the sender may be a user who sent the cryptocurrency in the transaction information for previous cryptocurrency payment.

Further, the transaction information for the cryptocurrency payment may include a data structure of input data ID and output data OD, where the input data ID may contain the transaction ID of the previous cryptocurrency payment, the permission information, and the public key for cryptocurrency payment, and the output data OD may contain the OP_DUP information, the amount of cryptocurrency, and the receiver identification information.

Figure 5B:
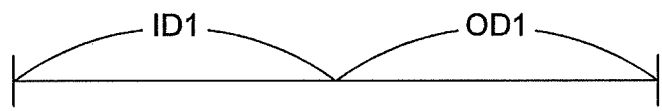

By referring to FIG. 5B, the transaction information for storing the public key may include (i) a transaction ID of the previous cryptocurrency payment, to be used for locating cryptocurrency to be spent which is part of cryptocurrency amount owned by the sender, using the transaction information for the previous cryptocurrency payment, (ii) permission information on whether the sender is authorized to use the cryptocurrency, (iii) a public key for cryptocurrency payment required for validating the permission information, (iv) registration fee information on amount of fees required for registration of the public key for the public certificate needed for the issuance, (v) OP_RETURN information which represents that the transaction information for storing the public key for the public certificate is not a monetary transaction related to a cryptocurrency payment but a meta-transaction for recording information, and (vi) the public key for the public certificate.

Herein, the transaction information for storing the public key may include a data structure of input data ID1 and output data OD1, where the input data ID1 may contain the transaction ID for the previous cryptocurrency payment, the permission information, the public key for cryptocurrency payment, and registration fee information of the public key for the public certificate, and the output data OD1 may contain the OP_RETURN information, and the public key for the public certificate.

Herein, the registration fee information of the public key for the public certificate may be a cost paid to a miner related to registration of the transaction information for storing the public key in the blockchain of the blockchain nodes 500, which costs about 0.0001 bitcoin. Also, registration fee information on a fee amount required for registration of the user-verifying hash information for authentication may be a cost paid to a miner related to registration of the transaction information for user verification in the blockchain of the blockchain nodes 500.

As of July 2015, 0.0001 bitcoin amounts to about mere 4 cents, and the total cost for issuing the public certificate based on the cryptocurrency amounts to less than 10 cents.

Figure 5C:
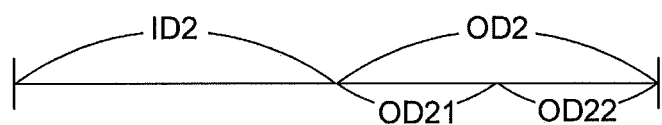
Figure 5D:
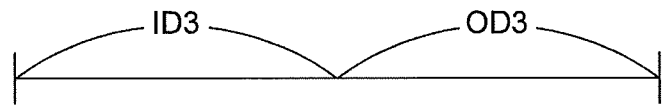
Figure 7:
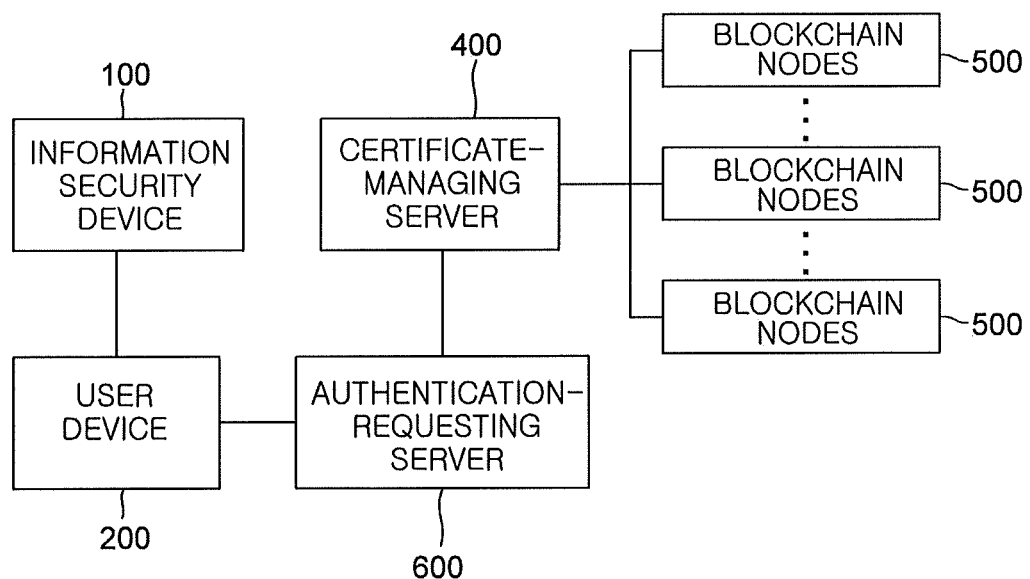
FIG. 7 is a block diagram illustrating a system for authenticating the public certificate based on the blockchain in accordance with the present invention.
Figure 8:
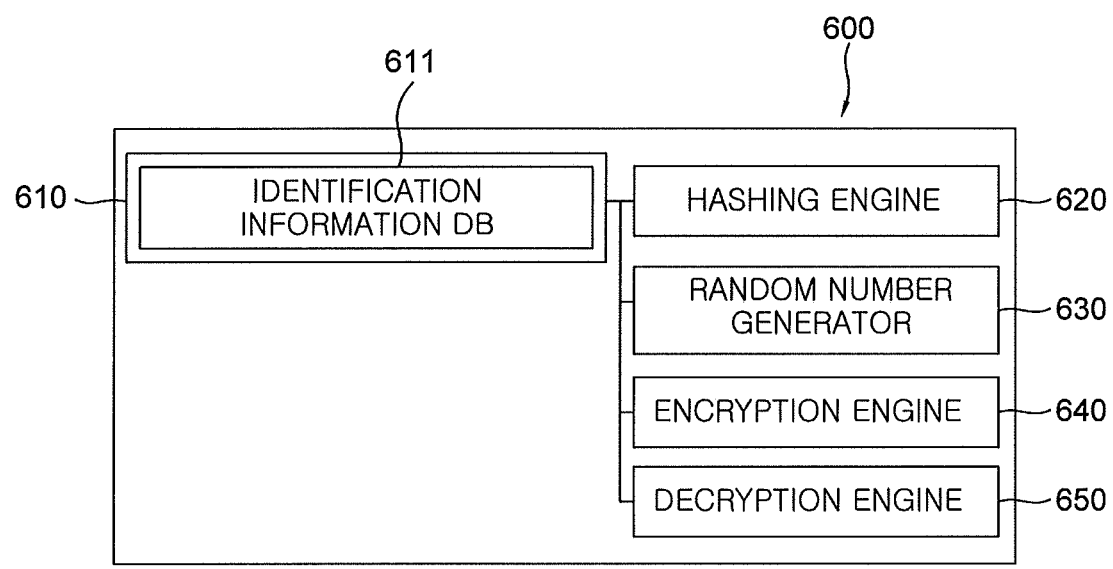
FIG. 8 is a block diagram illustrating a detailed configuration of an authentication-requesting server of the system for authenticating the public certificate based on the blockchain in accordance with the present invention.
Figure 9:
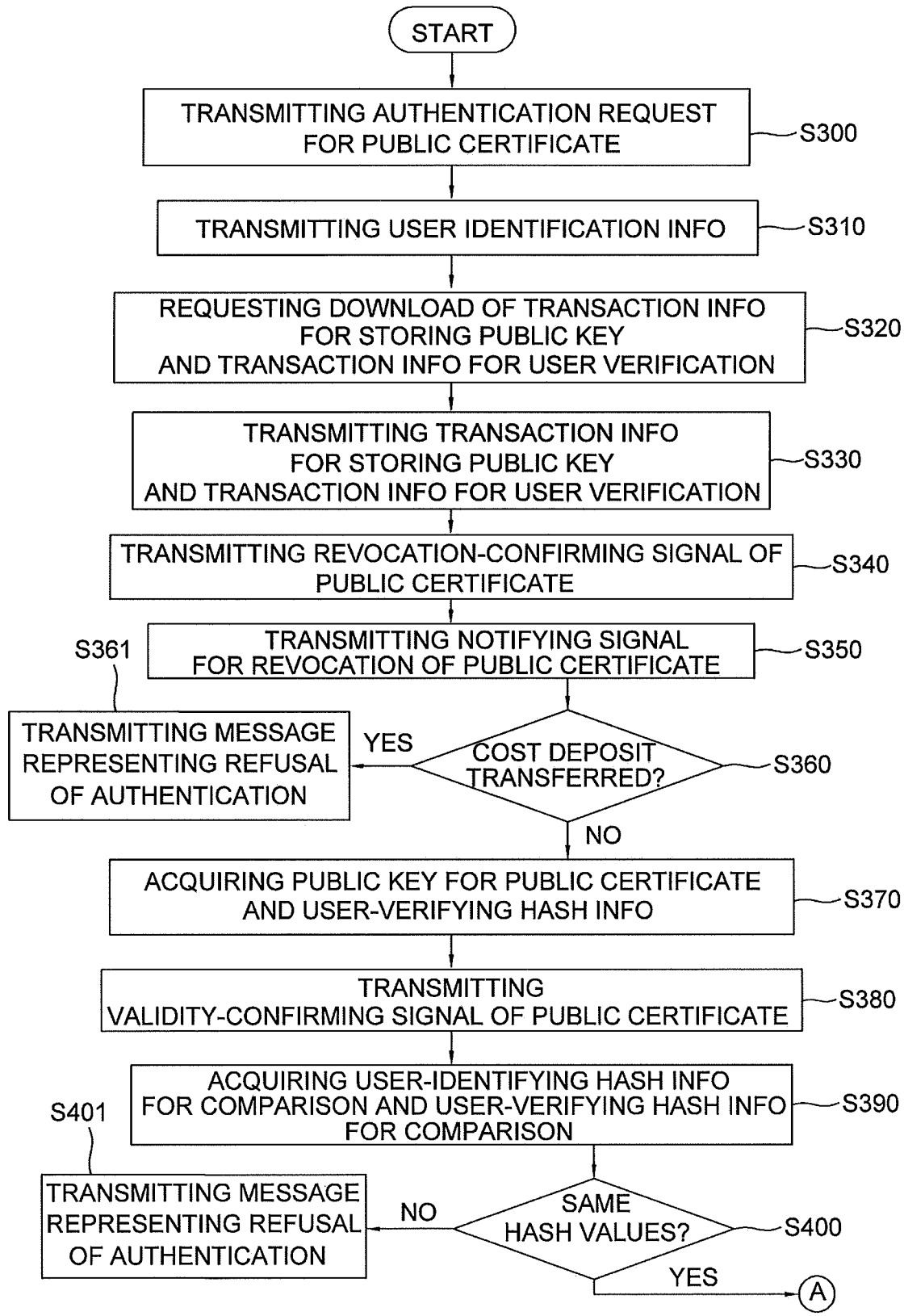
FIGS. 9 to 12 are sequence diagrams illustrating a process of the authentication of the public certificate by using the system for authenticating the public certificate based on the blockchain in accordance with the present invention.
Figure 10:
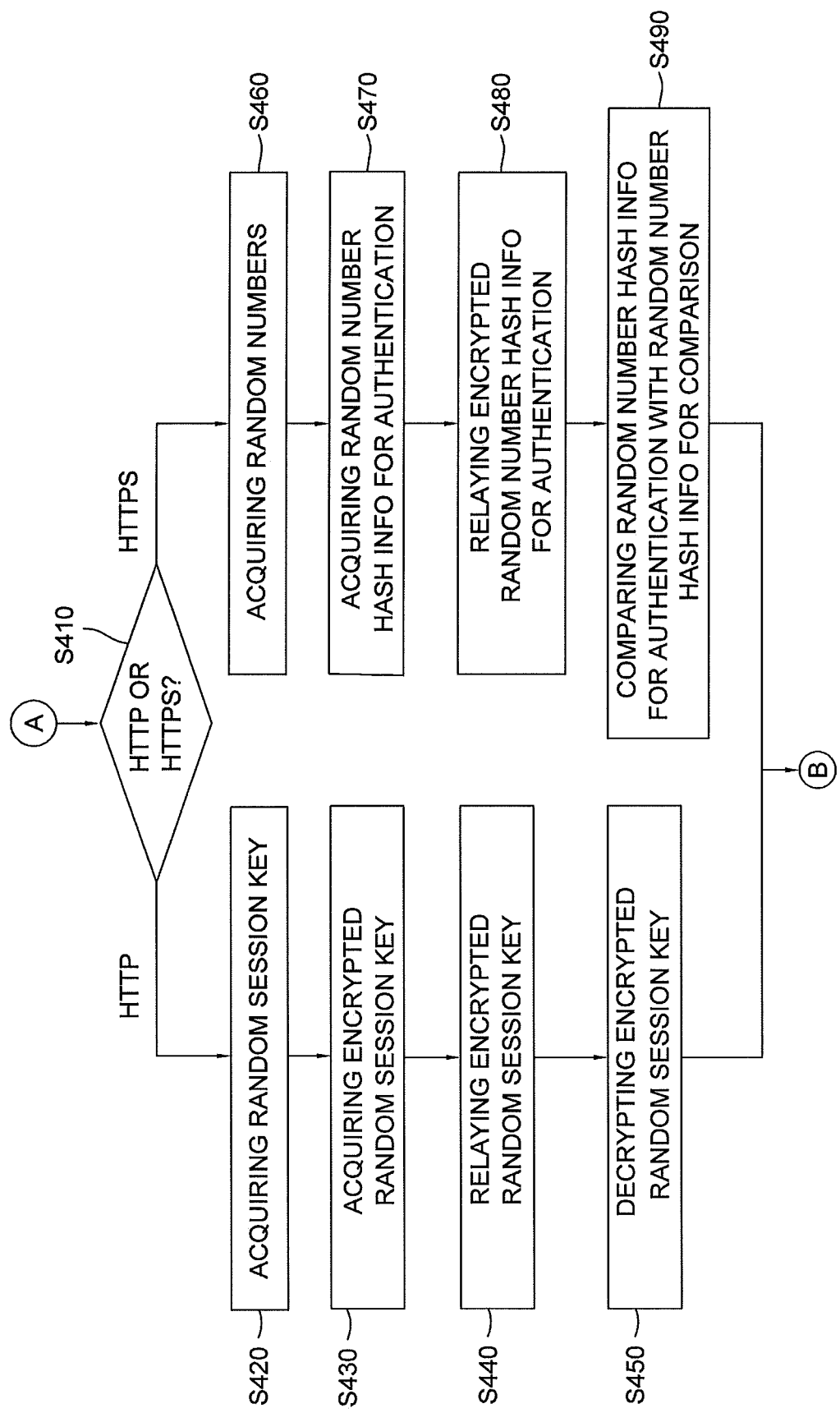
Figure 11:
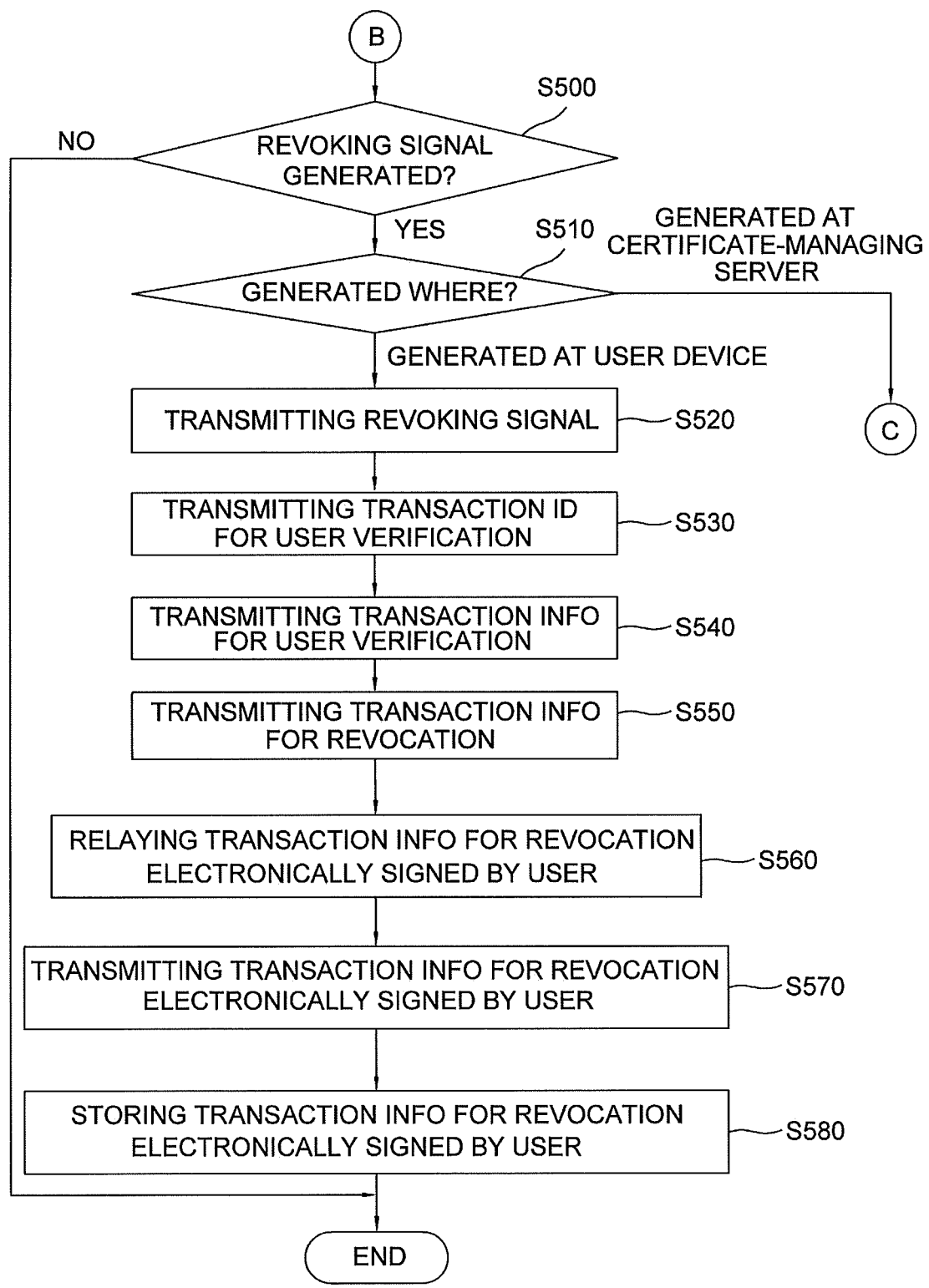
Figure 12:
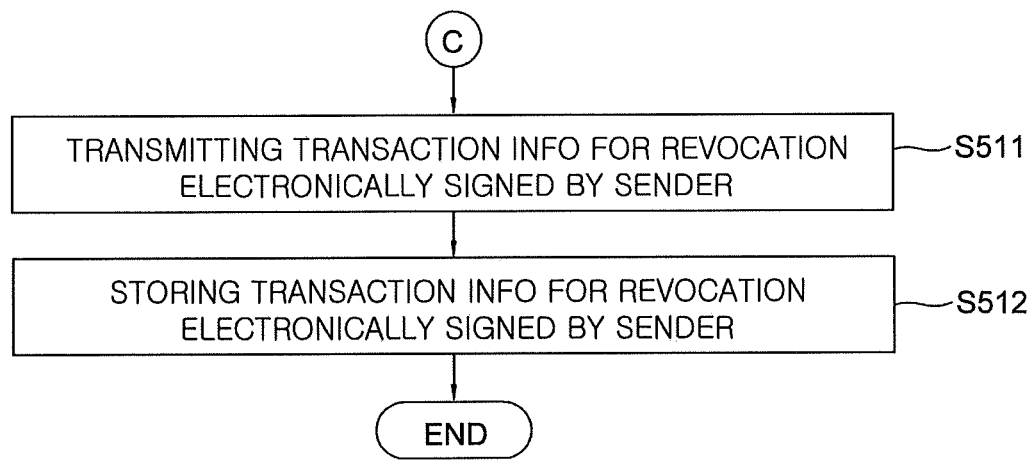
Figure 13:
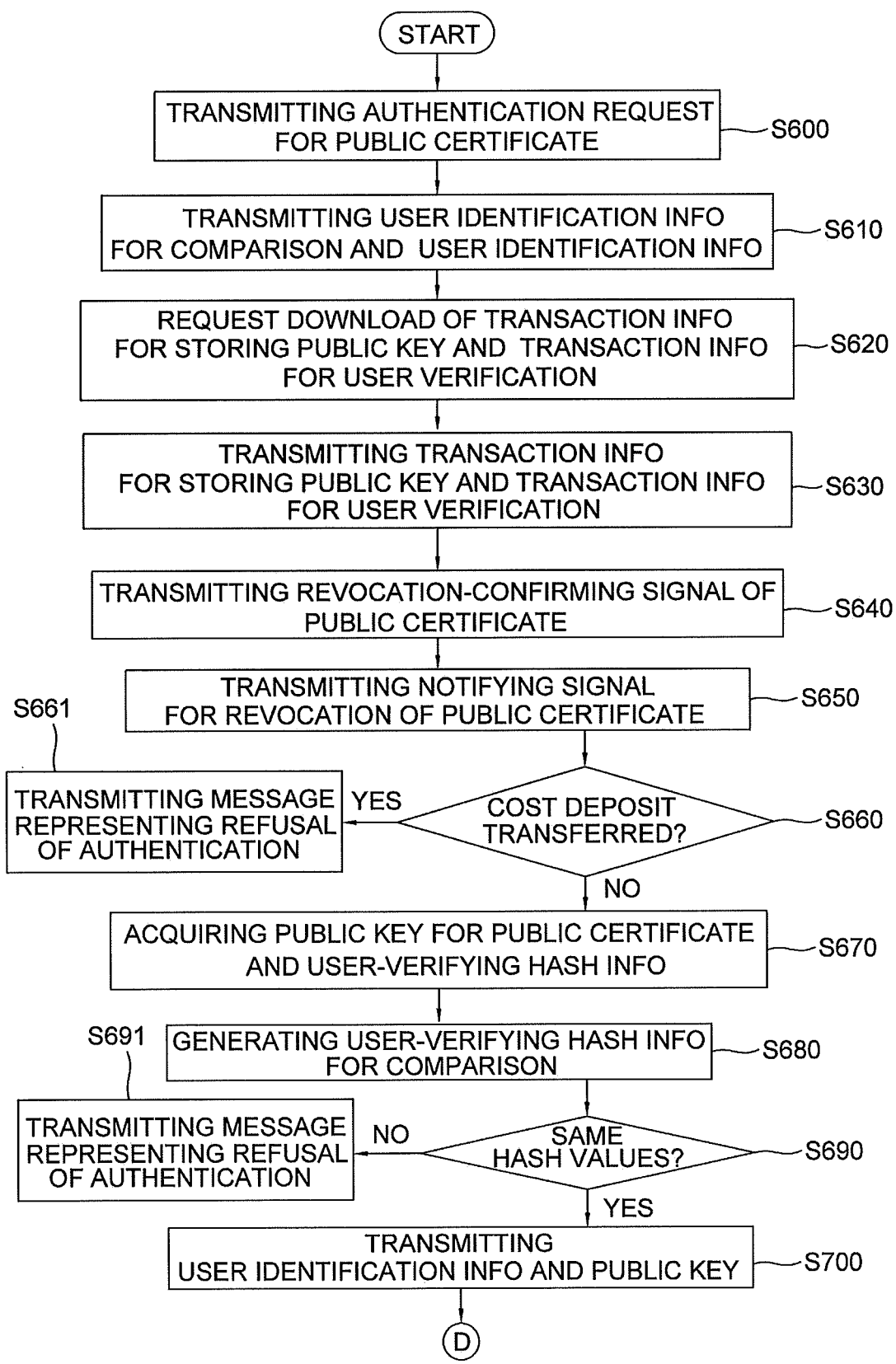
FIGS. 13 to 16 are sequence diagrams illustrating a method for authenticating the public certificate based on the blockchain in accordance with another example of the present invention.
Figure 14:
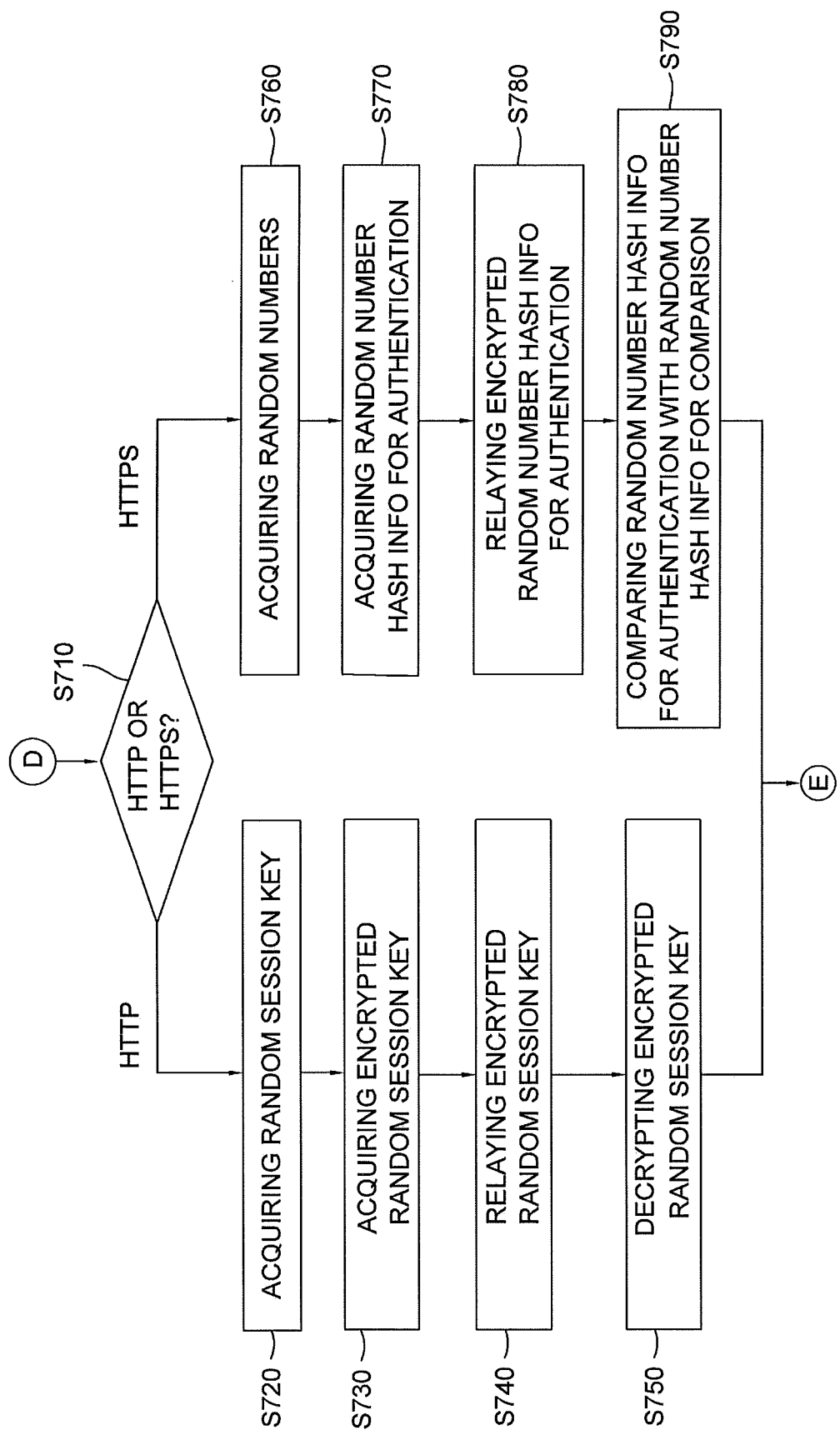
Figure 15:
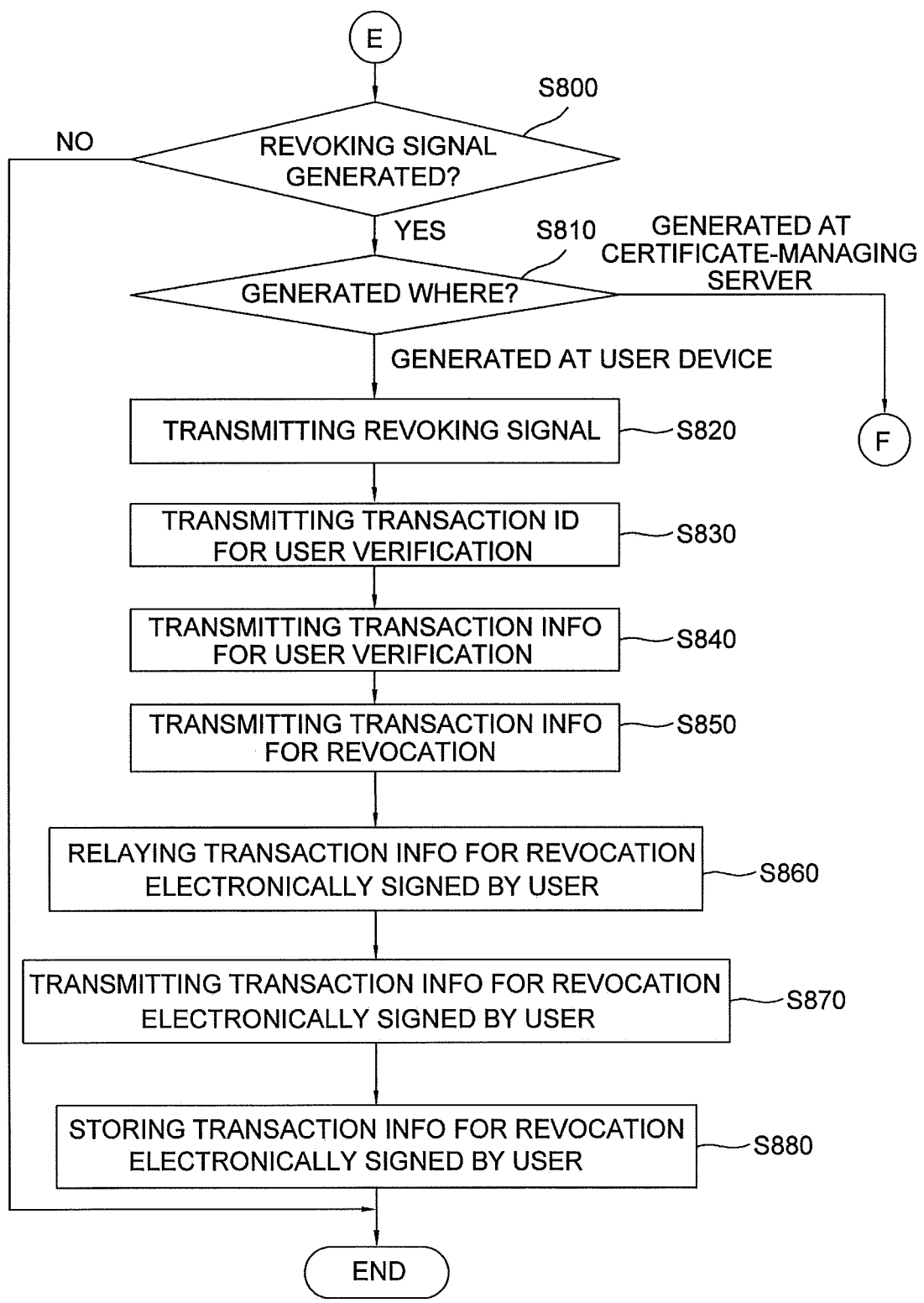
Figure 16:
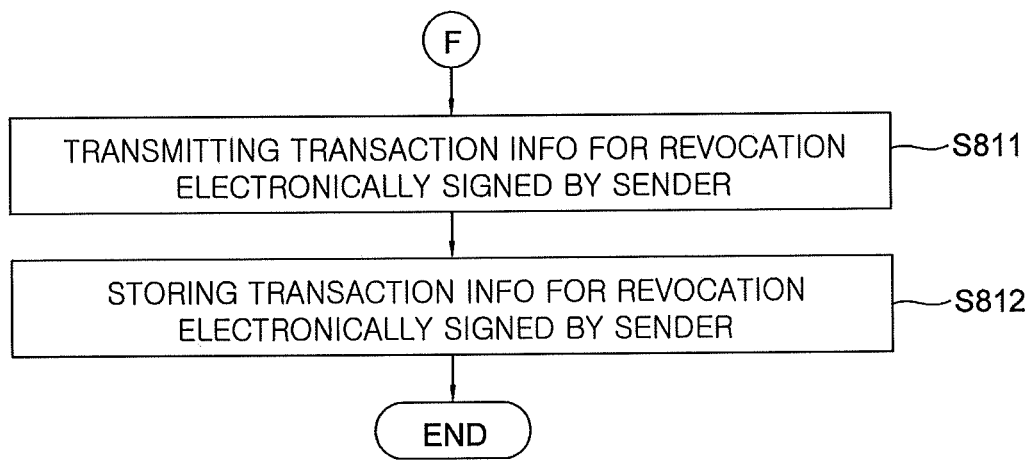

Further, by referring to FIG. 5C, the transaction information for user verification may include (i) a transaction ID of previous cryptocurrency payment, to be used for locating cryptocurrency to be spent which is part of cryptocurrency amount owned by the sender, using the transaction information for the previous cryptocurrency payment, (ii) permission information on whether the sender is authorized to use the cryptocurrency, (iii) a public key for the cryptocurrency payment required for validating the permission information, (iv) registration fee information on a fee amount required for registration of the user-verifying hash information for authentication needed for the issuance, (v) cost deposit information on a fee amount to be used to revoke the public certificate, (vi) OP_RETURN information which represents that the transaction information for user verification is not a monetary transaction related to a cryptocurrency payment but a meta-transaction for recording information, (vii) revocation-confirming information which contains transfer information including (iii-1) amount of a cost deposit and (iii-2) a reserve cryptocurrency address for transfer of the cost deposit corresponding to the cost deposit information to a designated cryptocurrency address, if the transaction information for user verification is stored in the blockchain of the blockchain nodes 500, and (viii) the user-verifying hash information for authentication.

By this, the blockchain nodes 500 may store the transaction information for user verification, and may store information representing that the cost deposit is transferred to the designated cryptocurrency address by referring to the revocation-confirming information, providing data for confirming whether the public certificate is revoked.

Also, the transaction information for user verification may include a data structure of input data ID2 and output data OD2, where the input data ID2 may contain the transaction ID for the previous cryptocurrency payment, the permission information of the sender, the public key for cryptocurrency payment, cost deposit information on the revocation of the public certificate, and registration fee information on a fee amount required for registration of the user-verifying hash information for authentication, and the output data OD2 may contain the OP_RETURN information, the revocation-confirming information, and the user-verifying hash information for authentication.

The blockchain nodes 500 are devices composing a cryptocurrency network that performs cryptocurrency transactions by verifying and recording the transactions.

Herein, the bitcoin is briefly explained. Bitcoin is a digital currency capable of payment in kind made by Satoshi Nakamoto in 2009, and has a decentralized structure which does not have a central device that issues and manages the currency. Rather, the transactions of bitcoin are processed by a distributed database based on a peer-to-peer, i.e., P2P, network and public key encryption.

Having a payment method as such, the bitcoin has advantages that payment is possible without using information required for credit card transactions such as card numbers, expiration dates, and CCV numbers and that fees are inexpensive. Further, bitcoin is stored in a digital wallet which is an electronic file, and a unique address, i.e., a public address, is allocated to this digital wallet, and the bitcoin transactions are processed based on the address.

In order to use bitcoin with such transactional characteristics, first of all, a bitcoin user may sign in to a bitcoin exchange, e.g., www.coinplug.com, and make a digital wallet then load it with KRW, i.e., Korean Won.

Thereafter, after confirming a current exchange rate of bitcoin at the exchange, the bitcoin user may place a buying order including an amount and a unit price of bitcoin. If a selling order matching the buying order exists, then a transaction occurs and the bitcoin user may pay with bitcoin for a product.

The blockchain nodes 500 may, as aforementioned, include one or more servers operated by the bitcoin exchange.

For this purpose, the respective blockchain nodes 500 may include digital wallets having the blockchain, and if transaction information created according to a typical bitcoin payment by the digital wallets is transmitted to the blockchain, this transaction information may be verified to authorize the bitcoin payment, and then the transaction information may be recorded and broadcast to the blockchain nodes 500 as designated.

That is, the broadcast of the transaction information for bitcoin payment is defined by a protocol, and if the transaction information for bitcoin payment occurs, one node broadcasts initial transaction information for bitcoin payment to eight designated nodes, then each of the eight designated nodes that received the information broadcasts again to another eight designated nodes in a pyramidic fashion, and the broadcast is completed when the information is transmitted to all of the blockchain nodes 500 which have the digital wallets containing the blockchain required for bitcoin payment.

Therefore, any transaction information including the transaction information for storing the public key and the transaction information for user verification aforementioned as well as the transaction information for bitcoin payment cannot be tampered with.

Meanwhile, such the blockchain nodes 500 may include the digital wallets having the blockchain, and may include a server or a terminal operated by a bitcoin miner, or a user's terminal for bitcoin payment, e.g., a PC or a smart phone.

In case of the bitcoin payment, the payment is based on the digital wallet containing the blockchain, and payment methods based on the digital wallet containing the blockchain may also include Litecoin, DarkCoin, Namecoin, Dogecoin, and Ripple, and these may be used instead of bitcoin when verifying authenticity of the certificate of financial institutions in accordance with the present invention.

Further, the blockchain of the blockchain nodes 500 may include private information as well as the transaction information for bitcoin payment. That is, the transaction information for user verification, and the transaction information for storing the public key including the user-verifying hash information and the public key required when authenticating the public certificate based on the blockchain may also be stored.

That is, if the transaction information for bitcoin payment in which OP_RETURN, i.e., Operation Code [RETURN], information is enclosed is transmitted, then each digital wallet in the respective blockchain nodes 500 broadcasts the transaction information as private information, not as information representing a bitcoin payment, and an inclusion of the OP_RETURN information into the transaction information for verification plays a major role in determining authenticity of digital contents.

Herein, if the digital wallet of the blockchain nodes 500 detects an OP_RETURN information in the transaction information for bitcoin payment when authorizing the bitcoin payment, the digital wallet may send a notification that the information with the OP_RETURN in it is used to represent an arbitrary 40 byte long data, not transaction information.

A process of the issuance of the public certificate based on the blockchain by using the system for issuing the public certificate based on the blockchain in accordance with the present invention is described as follows.

First, the user may visit a bank which operates the issuance-requesting server 300 and may provide the user identification information like the name of the user, the birth date of the user, the phone number, and the email address, then the bank may instruct the issuance-requesting server 300 to store the provided user identification information in the identification information DB 311.

Thereafter, the bank which operates the issuance-requesting server 300 may hand to the user the information security device 100 whose memory 120 stores the private key randomly generated from the random number generator 110. Herein, the user, as well as the bank which operates the issuance-requesting server 300, may purchase the information security device 100.

Thereafter, on condition that the acquired information security device 100 is connected to the user device 200 at a step of S100, the user may run a mobile app or a dedicated program, which guides the user in issuing the public certificate based on the cryptocurrency, installed on the user device 200 to connect to the issuance-requesting server 300, and then transmit the personal information for the issuance of the public certificate based on the blockchain, where the personal information includes the user identification information required for the issuance, to the issuance-requesting server 300 to thereby request the issuance, at a step of S110.

Thereafter, on condition that the transmitted personal information is matched against the identification information DB 311 and the user is recognized by the matching, the issuance-requesting server 300 may create and transmit a guiding signal, which requests sending of the public key, to the user device 200, at a step of S120.

Thereafter, the user device 200 may relay the transmitted guiding signal to the information security device 100, at a step of S130.

Thereafter, if the guiding signal is relayed, the information security device 100 may instruct the encryption engine 130 to create the public key based on the private key stored in the memory 120, and transmit the public key to the user device 200, at a step of S140.

The user device 200 may relay the public key to the issuance-requesting server 300, at a step of S150.

If the public key is received, the issuance-requesting server 300 may instruct its hashing engine 320 to hash the personal information and acquire the user-identifying hash information for authentication. Then, the issuance-requesting server 300 may acquire the user-identifying hash information for authentication, the public key, and the user identification information corresponding to the user among all the pieces of user identification information included in all the pieces of personal information, to thereby create and transmit a transaction-requesting signal to the certificate-managing server 400, at a step of S160.

Also, the certificate-managing server 400 may (i) instruct its transaction-processing engine 420 to store the user identification information, which is included in the transaction-requesting signal, in the keyword DB 411 for searching transaction by user, and (ii) create (ii-1) the transaction information for storing the public key, which includes the public key and (ii-2) the transaction ID for storing the public key to be used as a key value for searching the transaction information for storing the public key, at a step of S170.

Thereafter, the certificate-managing server 400 may instruct its hashing engine 430 to hash the transaction ID for storing the public key and the user-identifying hash information for authentication in the transaction-requesting signal, to thereby acquire user-verifying hash information for authentication, at a step of S180.

Also, the certificate-managing server 400 may instruct its transaction-processing engine 420 to (i) transmit the transaction information for storing the public key to the blockchain nodes 500, (ii) store the transaction ID for storing the public key in the keyword DB 411, (iii) create (iii-1) transaction information for user verification including the user-verifying hash information for authentication and (iii-2) a transaction ID for user verification to be used as a key value for searching the transaction information for user verification, (iv) transmit the transaction information for user verification to the blockchain nodes 500, and (v) store and manage the transaction ID for user verification in the keyword DB 411, at a step of S190.

The blockchain nodes 500 may store the transaction information for storing the public key and the transaction information for user verification in the blockchain to thereby complete the issuance, at a step of S200.

Then, if the issuance is completed at the step of S200, the certificate-managing server 400 may notify the user device 200 of the completion of the issuance, at a step of S210.

FIGS. 9 to 12 illustrate a method and a system for verifying the public certificate based on the blockchain, which is the part for the verification. Before explaining the drawings, part described in the part for the issuance will be omitted as much as possible, and the elements not described in the part for the issuance will be described in this example embodiment of the part for the verification.

As illustrated, the system for verifying the public certificate based on the blockchain in accordance with the present invention may include the information security device 100, the user device 200, an authentication-requesting server 600, the certificate-managing server 400, and the blockchain nodes 500.

First, the information security device 100, as aforementioned, may be a device whose internals cannot be accessed physically and on which programs cannot be further installed, and because the device generates a private key for the public certificate inside itself by using its random number generator 110, transmits the private key to a user in the memory 120, and generates the public key in the information security device 100, the device may prevent the leakage of the private key and provide secure authentication of the public certificate without possibility of being compromised.

For this purpose, the information security device 100 may further include its decryption engine 160 and its hashing engine 140 for performing the authentication of the public certificate.

The user device 200 may be a device that requests the authentication of the public certificate based on the blockchain.

The authentication-requesting server 600 may include its random number generator 630 and its encryption engine 640, and may relay a request for the authentication by transmitting the user identification information on the user who operates the user device 200, in response to the request for the authentication from the user device 200.

For this purpose, the authentication-requesting server 600 may include a DB part 610 which stores the user identification information on the user who operates the user device 200, and has an identification information DB 611 which stores all the pieces of user identification information related to the issuance of the public certificate.

Based on this, the authentication-requesting server 600 may acquire the user identification information on the user who operates the user device 200 from the identification information DB 611, in response to the authentication request from the user device 200, and may transmit the user identification information to the certificate-managing server 400.

The certificate-managing server 400 may request a download of the transaction information for storing the public key and the transaction information for user verification, by transmitting the transaction ID for user verification and the transaction ID for storing the public key corresponding to the user identification information received from the authentication-requesting server 600.

For this purpose, the certificate-managing server 400 may include its DB part 410 having the keyword DB 411 which stores (i) the user identification information corresponding to the personal information for the issuance of the public certificate where the personal information has the user identification information used at a time of the issuance, (ii) the transaction ID for storing the public key to be used as a key value for searching the transaction information for storing the public key, and (iii) the transaction ID for user verification to be used as a key value for searching the transaction information for user verification.

Herein, the transaction information for user verification may further include transfer information having amount of a cost deposit and a reserve cryptocurrency address for transfer of the cost deposit corresponding to cost deposit information to a designated cryptocurrency address, if the cost deposit information on a revocation of the public certificate and the transaction information for user verification are stored in the blockchain of the blockchain nodes 500.

By this process, the certificate-managing server 400 may instruct its transaction-processing engine 420 to acquire the reserve cryptocurrency address for revocation of the public certificate from the transfer information on the cost deposit included in the transaction information for user verification, may create a revocation-confirming signal which requests information on whether the cost deposit corresponding to amount of cryptocurrency loaded at the acquired reserve cryptocurrency address is transferred, and may transmit the revocation-confirming signal to the blockchain nodes 500. Herein, the revocation-confirming signal may be transmitted to plurality of the blockchain nodes 500 or to a pre-designated one of the blockchain nodes 500.

The blockchain nodes 500 may transmit to the certificate-managing server 400 a notifying signal for revocation which informs whether the cost deposit loaded at the reserve cryptocurrency address is transferred, where the cost deposit is retrieved from the blockchain by referring to the reserve cryptocurrency address included in the revocation-confirming signal.

The transaction-processing engine 420 of the certificate-managing server 400 may confirm whether the cost deposit is transferred by referring to the notifying signal, and if the cost deposit is determined as transferred, then may transmit a message representing a refusal of the authentication of the public certificate to the user device 200.

Then, the certificate-managing server 400 may retrieve the transaction ID for storing the public key and the transaction ID for user verification from the keyword DB 411 by referring to the user identification information, and may instruct its transaction-processing engine 420 to acquire the public key and the user-verifying hash information for authentication from the transaction information for storing the public key and the transaction information for user verification.

The blockchain nodes 500 may (i) authorize a cryptocurrency payment by verifying transmitted transaction information on cryptocurrency payment, (ii) store in the blockchain (ii-1) the transaction information on cryptocurrency payment, (ii-2) the transaction information for storing the public key, where the transaction information includes the public key, and (ii-3) the transaction information for user verification including the user-verifying hash information for authentication, and (iii) transmit to the certificate-managing server 400 the transaction information for storing the public key and the transaction information for user verification retrieved from the blockchain by respectively referring to the transaction ID for storing the public key and the transaction ID for user verification received from the certificate-managing server 400.

Especially, one of the major characteristics of the present invention is that the certificate-managing server 400 may acquire the public key and the user-verifying hash information for authentication from the transaction information for storing the public key and the transaction information for user verification transmitted from the blockchain nodes 500, and may transmit to the authentication-requesting server 600 a validity-confirming signal including the acquired public key, the acquired user-verifying hash information for authentication, and the transaction ID for storing the public key.

Then, the authentication-requesting server 600 may retrieve the user identification information from the identification information DB 611, acquire user-identifying hash information for comparison by hashing the retrieved user identification information, and acquire user-verifying hash information for comparison calculated by hashing the acquired user-identifying hash information for comparison and the transaction ID for storing the public key included in the validity-confirming signal transmitted from the certificate-managing server 400, and if a hash value of the user-verifying hash information for authentication included in the validity-confirming signal received from the certificate-managing server 400 corresponds to a hash value of the user-verifying hash information for comparison after acquiring the hash value of the user-verifying hash information for authentication and the hash value of the user-verifying hash information, then may confirm a protocol used for Internet communications between the user devices 200.

Herein, the protocol is used for transfer of hypertext documents between a web server and an Internet browser of a user on the Internet, and includes HTTP (Hypertext Transfer Protocol) and HTTPS (Hypertext Transfer Protocol over Secure Socket Layer) whose difference is whether the documents being transferred are encrypted. That is, the documents are transmitted as plain text in HTTP, and as encrypted text in HTTPS.

Thus, the usage environment of HTTP is vulnerable to hacking because documents are transferred in plain text.

To resolve the risk of hacking and to authenticate the user as a legitimate user of the public certificate, the certificate-managing server 400 may instruct the random number generator 630 to generate a random session key if the protocol between the user device 200 is determined as HTTP, may instruct an encryption engine 640 to acquire an encrypted random session key by encrypting the random session key using the public key included in the validity-confirming signal, and may relay the encrypted random session key to the information security device 100 by way of the user device 200.

The information security device 100 may instruct its decryption engine 160 to decrypt the encrypted random session key by using the private key for the public certificate stored in the memory 120, to acquire the random session key, and may transmit the random session key to the user device 200 to thereby perform the authentication of the user as the legitimate user. That is, if the information security device 100 of the user does not have the private key, the decryption cannot be performed and thus the user cannot be verified as the legitimate user.

In addition, even in the usage environment of HTTP, because the documents are transmitted over a secure communication line between the user device 200 and the authentication-requesting server 600 using encryption based on the random session key provided by the information security device 100, the leakage of the private key is prevented, even after the user authentication, and the secure authentication based on the blockchain is performed. For this purpose, the user device 200 may include its encryption engine and its decryption engine.

On the other hand, if the protocol is determined as HTTPS, the documents transferred over the communication line between the user device 200 and the authentication-requesting server 600 are already encrypted, therefore only thing required is the user authentication.

For this purpose, if the protocol between the user devices 200 is determined as HTTPS, the certificate-managing server 400 may instruct the random number generator 630 to acquire random numbers and relay the random numbers to the information security device 100 by way of the user device 200.

The information security device 100 may instruct its hashing engine 140 to acquire random number hash information for authentication by hashing the random numbers, instruct its encryption engine 130 to acquire encrypted random number hash information for authentication by encrypting the random number hash information for authentication using the private key stored in the memory 120, and relay the encrypted random number hash information for authentication to the authentication-requesting server 600 by way of the user device 200.

The authentication-requesting server 600 may instruct its hashing engine 620 to hash the random numbers, which have been transmitted to the information security device 100, to acquire random number hash information for comparison, may instruct its decryption engine 650 to decrypt the encrypted random number hash information for authentication by using the public key to acquire the random number hash information for authentication, and may confirm if a hash value of the random number hash information for authentication corresponds to a hash value of the random number hash information for comparison to thereby perform the authentication of the user.

Meanwhile, the user or the certificate-managing server 400 which corresponds to the sender may revoke the public certificate.

For this purpose, if a revoking signal which requests revocation of the public certificate is generated, the certificate-managing server 400 may instruct its transaction-processing engine 420 to retrieve the transaction ID for user verification from the keyword DB 411, to thereby transmit the transaction ID for user verification to the blockchain nodes 500.

The blockchain nodes 500 may transmit to the certificate-managing server 400 the transaction information for user verification retrieved therefrom by referring to the transmitted transaction ID for user verification.

If the transaction information for user verification is received, the certificate-managing server 400 may instruct its transaction-processing engine 420 to generate transaction information for revocation and to transmit the transaction information for revocation to the blockchain nodes 500, where the transaction information for revocation includes input data ID3 and output data OD3, where the ID3 may have (i) transfer-guiding information which guides a transfer of the deposit cost loaded at the reserve cryptocurrency address by referring to the OD2, (ii) multiple permission information for cryptocurrency containing permission for the sender or user to use the deposit cost loaded at the reserve cryptocurrency address, and (iii) a public key for cryptocurrency payment required for determining validity of the multiple permission information for cryptocurrency, and the OD3 may have (i) a receiving cryptocurrency address of a receiver where the deposit cost loaded at the reserve cryptocurrency address is to be transmitted, and (ii) receiver identification information on the receiver.

The blockchain nodes 500 may store the transmitted transaction information for revocation in the blockchain to thereby revoke the public certificate of the user.

Meanwhile, if the revoking signal is determined as generated at the user device 200, the certificate-managing server 400 may transmit the generated transaction information for revocation to the user device 200 to thereby request an electronic signature.

The user device 200 may instruct the encryption engine 130 to electronically sign and transmit the transaction information for revocation to the certificate-managing server 400.

Thereafter, the certificate-managing server 400 may transmit to the blockchain nodes 500 the transaction information for revocation electronically signed by the user received from the user device 200.

Then, if the revoking signal is determined as generated at the certificate-managing server 400, the certificate-managing server 400 may instruct its transaction-processing engine 420 to electronically sign the transaction information for revocation with the private key of the sender which corresponds to the certificate-managing server 400, and transmit the transaction information for revocation electronically signed by the sender to the blockchain nodes 500.

A process of the authentication of the public certificate based on the blockchain by using the system for authenticating the public certificate based on the blockchain in accordance with the present invention is described as follows.

The user device 200 may transmit an authentication request for the public certificate based on the blockchain by connecting to the authentication-requesting server 600, at a step of S300.

The authentication-requesting server 600 may acquire the user identification information on the user who operates the user device 200 from the identification information DB 611, in response to the authentication request from the user device 200, and may transmit the user identification information to the certificate-managing server 400, at a step of S310.

The certificate-managing server 400 may transmit to the blockchain nodes 500 the transaction ID for storing the public key and the transaction ID for user verification retrieved from the keyword DB 411 by referring to the user identification information, to thereby request a download of the transaction information for storing the public key and the transaction information for user verification, at a step of S320.

The blockchain nodes 500 may transmit to the certificate-managing server 400 the transaction information for storing the public key and the transaction information for user verification retrieved therefrom, by referring to the transmitted transaction ID for storing the public key and the transmitted transaction ID for user verification, at a step of S330.

The certificate-managing server 400 may instruct its transaction-processing engine 420 to acquire the reserve cryptocurrency address for revocation of the public certificate from the transfer information on the cost deposit included in the transaction information for user verification, may create a revocation-confirming signal which requests information on whether the cost deposit corresponding to amount of cryptocurrency loaded at the acquired reserve cryptocurrency address is transferred, and may transmit the revocation-confirming signal to the blockchain nodes 500, at a step of S340.

The blockchain nodes 500 may transmit to the certificate-managing server 400 a notifying signal for revocation which informs whether the cost deposit loaded at the reserve cryptocurrency address is transferred, where the cost deposit is retrieved from the blockchain by referring to the reserve cryptocurrency address included in the revocation-confirming signal, at a step of S350.

The transaction-processing engine 420 of the certificate-managing server 400 may confirm whether the cost deposit is transferred, by referring to the notifying signal at a step of S360, and if the cost deposit is determined as transferred, may transmit a message representing a refusal of the authentication of the public certificate to the user device 200 at a step of S361, and if the cost deposit is determined as not transferred, may acquire the public key and the user-verifying hash information for authentication respectively from the transaction information for storing the public key and the transaction information for user verification, at a step of S370.

The certificate-managing server 400 may transmit to the authentication-requesting server 600 a validity-confirming signal of the public certificate, where the validity-confirming signal includes (i) the transaction ID for storing the public key in the keyword DB 411, (ii) the public key, and (iii) the user-verifying hash information for authentication, at a step of S380.

The authentication-requesting server 600 may retrieve the user identification information from its identification information DB 611, instruct its hashing engine 620 to acquire user-identifying hash information for comparison by hashing the user identification information, and acquire user-verifying hash information for comparison calculated by hashing the user-identifying hash information for comparison and the transaction ID for storing the public key included in the validity-confirming signal transmitted from the authentication-requesting server 600, at a step of S390.

Thereafter, the hashing engine 620 of the authentication-requesting server 600 may determine whether a hash value of the user-verifying hash information for authentication included in the validity-confirming signal transmitted from the certificate-managing server 400 corresponds to a hash value of the user-verifying hash information for comparison by calculating two hash values, at a step of S400, and if the two hash values are not identical to each other, then may transmit a message representing the refusal of the authentication to the user device 200, at a step of S401.

The authentication-requesting server 600 may calculate each hash value of the user-verifying hash information and the user-verifying hash information for comparison, and if said each hash value is determined as identical to each other, may confirm whether a protocol used for Internet communications between the user device 200 and the authentication-requesting server 600 is HTTP or HTTPS, at a step of S410.

First, if the protocol is determined as HTTP, the authentication-requesting server 600 may instruct its random number generator 630 to acquire a random session key, at a step of S420, and may instruct its encryption engine 640 to encrypt the random session key by using the public key included in the validity-confirming signal, to thereby acquire and transmit an encrypted random session key to the user device 200, at a step of S430.

The user device 200 may relay the encrypted random session key to the information security device 100 over a wired or wireless communication line, at a step of S440.

The information security device 100 may instruct its decryption engine 160 to decrypt the encrypted random session key by using the private key for the public certificate stored in the memory 120, to acquire the random session key, and may transmit the random session key to the user device 200 to thereby perform the authentication of the user, at a step of S450.

Then, if the protocol between the user device 200 and the authentication-requesting server 600 is determined as HTTPS, the authentication-requesting server 600 may instruct its random number generator 630 to acquire random numbers and relay the random numbers to the information security device 100 by way of the user device 200, at a step of S460.

Thereafter, the information security device 100 may instruct its hashing engine 140 to acquire random number hash information for authentication by hashing the relayed random numbers at a step of S470, instruct its encryption engine 130 to acquire encrypted random number hash information for authentication by encrypting the random number hash information for authentication using the private key stored in the memory 120, and relay the encrypted random number hash information for authentication to the authentication-requesting server 600 by way of the user device 200, at a step of S480.

Thereafter, the authentication-requesting server 600 may instruct its hashing engine 620 to hash the random numbers, which have been transmitted to the information security device 100, to acquire random number hash information for comparison, may instruct its decryption engine 650 to decrypt the encrypted random number hash information for authentication by using the public key to acquire the random number hash information for authentication, and may confirm if a hash value of the random number hash information for authentication corresponds to a hash value of the random number hash information for comparison to thereby perform the authentication of the user, at a step of S490.

Meanwhile, whether the revoking signal is generated is determined at a step of S500, and if the revoking signal is determined as generated, whether the revoking signal is generated at the user device 200 or the certificate-managing server 400 is determined at a step of S510.

First, if the revoking signal is determined as generated at the user device 200, then the user device 200 may transmit the generated revoking signal to the certificate-managing server 400, at a step of S520.

The certificate-managing server 400 may instruct its transaction-processing engine 420 to retrieve the transaction ID for user verification from the keyword DB 411 by referring to the transmitted revoking signal, to thereby transmit the transaction ID for user verification to the blockchain nodes 500, at a step of S530.

The blockchain nodes 500 may transmit to the certificate-managing server 400 the transaction information for user verification retrieved therefrom by referring to the transmitted transaction ID for user verification, at a step of S540.

Thereafter, the transaction-processing engine 420 of the certificate-managing server 400 may receive the transaction information for user verification, may generate transaction information for revocation and may relay the transaction information for revocation to the information security device 200 by way of the user device 200, to thereby request an electronic signature at a step of S550, where the transaction information for revocation includes input data ID3 and output data OD3, where the ID3 has (i) transfer-guiding information which guides a transfer of the deposit cost loaded at the reserve cryptocurrency address by referring to the OD2, (ii) multiple permission information for cryptocurrency containing permission for a sender or user to use the deposit cost loaded at the reserve cryptocurrency address, and (iii) a public key for cryptocurrency payment required for determining validity of the multiple permission information for cryptocurrency, and the OD3 has (i) a receiving cryptocurrency address of a receiver where the deposit cost loaded at the reserve cryptocurrency address is to be transmitted, and (ii) receiver identification information on the receiver at a step of S550.

The information security device 100 may instruct its encryption engine 130 to electronically sign the transaction information for revocation, and relay the result of signing to the certificate-managing server 400 by way of the user device 200, at a step of S560.

The certificate-managing server 400 may transmit to the blockchain nodes 500 the transaction information for revocation electronically signed by the user, at a step of S570.

The blockchain nodes 500 may store the transmitted transaction information for revocation in the blockchain at a step of S580, to thereby revoke the public certificate of the user.

Meanwhile, if the revoking signal is determined as generated, then, in the steps from S520 to S580 of determining where the revoking signal is generated, if the revoking signal is determined as generated at the certificate-managing server 400, the certificate-managing server 400 may instruct its transaction-processing engine 420 to receive the transaction information for user verification, to generate the transaction information for revocation, and to sign the generated transaction information for revocation using a private key of the sender which is the certificate-managing server 400, to thereby transmit the signed transaction information for revocation to the blockchain nodes 500, at a step of S511, where the transaction information for revocation includes input data ID3 and output data OD3, and the ID3 has (i) transfer-guiding information which guides a transfer of the deposit cost loaded at the reserve cryptocurrency address by referring to the OD2, (ii) multiple permission information for cryptocurrency containing permission for a sender or the user to use the deposit cost loaded at the reserve cryptocurrency address, and (iii) a public key for cryptocurrency payment required for determining validity of the multiple permission information for cryptocurrency, and the OD3 has (i) a receiving cryptocurrency address of a receiver where the deposit cost loaded at the reserve cryptocurrency address is to be transmitted, and (ii) receiver identification information on the receiver.

The blockchain nodes 500 may store the transaction information for revocation transmitted from the sender in the blockchain at a step of S512, to thereby revoke the public certificate of the user.

Finally, FIGS. 13 to 16 are drawings illustrating a method for authenticating the public certificate based on the blockchain in accordance with another example of the present invention, and the drawings related to the system for authentication are omitted, because the numerals are identical but only the functional relations are different from those of the aforementioned system for authentication.

The difference between the system and method of authenticating the public certificate based on the blockchain in accordance with said another example of the present invention and the aforementioned system and method of authenticating the public certificate based on the blockchain may lie in whether the process of confirming authenticity of the public certificate by hashing and determining of the user-verifying hash information for authentication and the user-verifying hash information for comparison is performed by either the authentication-requesting server 600 or the certificate-managing server 400.

That is, the system for authentication of the public certificate based on the blockchain in accordance with said another example of the present invention includes the information security device 100 having its decryption engine 160 and its memory 120 storing the private key for the public certificate; the user device 200 requesting the authentication of the public certificate based on the blockchain; the authentication-requesting server 600, which includes its random number generator 630 and its encryption engine 640, relaying a request for the authentication by transmitting the user identification information on the user, in response to the request for the authentication from the user device 200; the certificate-managing server 400 receiving the user-identifying hash information for comparison and the user identification information, requesting a download of the transaction information for storing the public key and the transaction information for user verification, by transmitting the transaction ID for user verification and the transaction ID for storing the public key, corresponding to the received user identification information, retrieved from the keyword DB 411; and the blockchain nodes 500 (i) authorizing the cryptocurrency payment by verifying transmitted transaction information on cryptocurrency payment, (ii) storing in the blockchain (ii-1) the transaction information on cryptocurrency payment, (ii-2) the transaction information for storing the public key, which includes the public key, and (ii-3) the transaction information for user verification which contains the user-verifying hash information for authentication, and (iii) transmitting to the certificate-managing server 400 the transaction information for storing the public key and the transaction information for user verification retrieved from the blockchain by respectively referring to the transaction ID for storing the public key and the transaction ID for user verification received from the certificate-managing server 400; where the certificate-managing server 400 may (i) acquire the public key and the user-verifying hash information for authentication respectively from the transaction information for storing the public key and the transaction information for user verification received from the blockchain nodes 500, (ii) acquire the user-verifying hash information for comparison by hashing the transmitted the user-identifying hash information for comparison and the transaction ID for storing the public key in the keyword DB 411, and (iii) transmit to the authentication-requesting server 600 the acquired public key and the user identification information if a hash value of the acquired user-verifying hash information for authentication is determined as identical to a hash value of the user-verifying hash information for comparison, where, if the public key for the public certificate and the user identification information are received, the authentication-requesting server 600 may confirm a protocol used for Internet communications between the user devices 200, and if the protocol is determined as HTTP, instructs its random number generator 630 to generate a random session key, and may instruct its encryption engine 640 to acquire an encrypted random session key by encrypting the random session key using the public key included in the validity-confirming signal, and to relay the encrypted random session key to the information security device 100 by way of the user device 200, and where the information security device 100 may instruct its decryption engine 160 to acquire the random session key by decrypting the encrypted random session key by using the private key stored in its memory 120, and to transmit the random session key to the user device 200, to thereby perform the authentication of the user.

Using these configurations, the system for authenticating the public certificate based on the blockchain in accordance with said another example of the present invention may include a step S600 of the user device 200 transmitting an authentication request for the public certificate based on the blockchain by connecting to the authentication-requesting server 600; a step S610 of the authentication-requesting server 600 acquiring the user identification information on the user from its identification information DB 611, in response to the authentication request, and instructing its hashing engine 620 to hash the acquired user identification information to acquire user-identifying hash information for comparison, and to send the user identification information and the user-identifying hash information for comparison to the certificate-managing server 400; a step S620 of the certificate-managing server 400 receiving the user identification information and the user-identifying hash information for comparison, transmitting to the blockchain nodes 500 a transaction ID for storing the public key and a transaction ID for user verification retrieved from the keyword DB 411 by referring to the user identification information, to thereby request a download of transaction information for storing the public key and transaction information for user verification; a step S630 of the blockchain nodes 500 transmitting to the certificate-managing server 400 the transaction information for storing the public key and the transaction information for user verification retrieved therefrom, by referring to the transmitted transaction ID for storing the public key and the transmitted transaction ID for user verification; a step S670 of the certificate-managing server 400 instructing its transaction-processing engine 420 to acquire the public key for the public certificate and user-verifying hash information for authentication respectively from the transaction information for storing the public key and the transaction information for user verification; a step S680 of the certificate-managing server 400 instructing its hashing engine 430 to hash the transmitted user-identifying hash information for comparison and the transaction ID for storing the public key in the keyword DB 411, to thereby acquire the user-verifying hash information for comparison; a step S690 of the hashing engine 430 of the certificate-managing server 400 determining whether a hash value of the user-verifying hash information for authentication corresponds to a hash value of the user-verifying hash information for comparison by calculating two hash values, and then determining whether the two hash values are identical to each other; a step S700 of the certificate-managing server 400, if the hash value of the user-verifying hash information for authentication is determined as identical to the hash value of the user-verifying hash information for comparison, transmitting the acquired public key and the user identification information to the authentication-requesting server 600; a step S710 of the authentication-requesting server 600, if the public key and the user identification information are received, confirming whether a protocol used for Internet communications between the user device 200 and the authentication-requesting server 600 is HTTP or HTTPS; a step S720 of the authentication-requesting server 600, if the protocol is determined as HTTP, instructing its random number generator 630 to acquire a random session key; a step S730 of the authentication-requesting server 600 instructing its encryption engine 640 to encrypt the random session key by using the public key included in the validity-confirming signal, to thereby acquire and transmit an encrypted random session key to the user device 200;

a step S740 of the user device 200 relaying the encrypted random session key to the information security device 100; a step S750 of the information security device 100 instructing its decryption engine 160 to decrypt the encrypted random session key by using the private key for the public certificate stored in its memory 120, and to acquire the random session key, and transmitting the random session key to the user device 200, to thereby perform the authentication of the user.

The present invention has an effect of performing the authentication of the public certificate even without the ActiveX controls by generating and storing the private key for the public certificate within the random number generator in a device whose internals cannot be accessed physically and on which programs cannot be further installed, thus preventing the leakage of the private key, and by storing and managing the public key, which requires maintenance, in the blockchain of the digital wallet in the blockchain nodes, using a distributed database based on peer-to-peer network (P2P), not a server managed by the CA, thus minimizing an additional cost which is required for maintenance of the public certificate issuance system with the high security against hacking.

Based on the explanation of the above embodiments, those skilled in the art can clearly understand that the present invention may be implemented by combination of software and hardware or hardware alone. The part contributing to the prior art or the object of a technical solution of the present invention may be implemented in a form of executable program command through a variety of computer components and may be manufactured as a computer program product or computer readable media including the product. The computer readable media or the product may include solely or in combination, program commands, data files, and data structures. The program commands included in the media or the product may be components specially designed for the present invention or may be known and usable to a skilled human in a field of computer software. The computer readable media for the product may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for issuing a public certificate on a blockchain, comprising:
   storing, by an information security device in a memory, a private key;
   receiving, by the user device from the issuance requesting server, a request for a public key, the public key corresponding to the private key;
   relaying, by the user device to the information security device, the request for the public key;
   generating, by the information security device, the public key based on the relayed request for the public key;
   transmitting, by the information security device to the user device, the public key;
   relaying, from the user device to the issuance-requesting server, the public key;
   hashing, by the issuance-requesting server, user information;
   transmitting, by the issuance-requesting server to a certificate-managing server, a transaction request, wherein the transaction request includes the user information, the public key, and the hashed user information;
   storing, by the certificate-managing server, the user information;

generating, by the certificate-managing server, first transaction information and a first transaction ID;

generating, by the certificate-managing server, user-verifying hash information by hashing (i) the first transaction ID and (ii) the hashed user information;

transmitting, by the certificate-managing server to blockchain nodes, the first transaction information, wherein the first transaction information includes the public key;

generating, by the certificate-managing server, second transaction information;

transmitting, by the certificate-managing server to the blockchain nodes, the second transaction information, wherein the second transaction information includes the user-verifying hash information; and storing, by the blockchain nodes in the blockchain, both the first transaction information and the second transaction information.

2. The method of claim 1, wherein, the user information includes at least two of a name of the user, a birth date of the user, a phone number of the user, and an e-mail address of the user.

3. The method of claim 1, wherein the first transaction information includes:
(i) a first transaction ID of a previous cryptocurrency payment,
(ii) permission information on whether a sender of the previous cryptocurrency payment is authorized to use the cryptocurrency,
(iii) a public key for cryptocurrency payment required to validate the permission information,
(iv) registration fee information on a fee amount required for registration of the public key for the public certificate needed for issuance,
(v) OP_RETURN information that includes information that the first transaction information is not a monetary transaction related to a cryptocurrency payment, but is instead a meta-transaction for recording information, and
(vi) the public key for the public certificate.

4. The method of claim 1, wherein the second transaction information includes:
(i) a second transaction ID of a previous cryptocurrency payment,
(ii) permission information on whether the sender is authorized to use the cryptocurrency,
(iii) registration fee information on a fee amount required for registration of the user-verifying hash information for authentication needed for issuance, and
(iv) OP_RETURN information that includes information that the second transaction information is not a monetary transaction related to a cryptocurrency payment, but is instead a meta-transaction for recording information.

* * * * *